United States Patent
Andrews et al.

(10) Patent No.: US 11,634,360 B2
(45) Date of Patent: Apr. 25, 2023

(54) CHEMICALLY STRENGTHENED LITHIUM DISILICATE-PETALITE GLASS-CERAMICS

(71) Applicant: Corning Incorporated, Corning, NY (US)

(72) Inventors: Ryan Claude Andrews, Elmira, NY (US); Albert Joseph Fahey, Corning, NY (US); Lisa Marie Noni, Horseheads, NY (US); Rostislav Vatchev Roussev, Painted Post, NY (US); Charlene Marie Smith, Corning, NY (US); Ljerka Ukrainczyk, Ithaca, NY (US); Shelby Kerin Wilson, Corning, NY (US)

(73) Assignee: Corning Incorporated, Corning, NY (US)

( * ) Notice: Subject to any disclaimer, the term of this patent is extended or adjusted under 35 U.S.C. 154(b) by 51 days.

(21) Appl. No.: 17/461,126

(22) Filed: Aug. 30, 2021

(65) Prior Publication Data
US 2021/0387905 A1    Dec. 16, 2021

Related U.S. Application Data

(62) Division of application No. 16/682,143, filed on Nov. 13, 2019, now Pat. No. 11,104,608.
(Continued)

(51) Int. Cl.
*C03C 21/00* (2006.01)
*C03C 10/00* (2006.01)

(52) U.S. Cl.
CPC ........ *C03C 21/002* (2013.01); *C03C 10/0018* (2013.01); *C03C 10/0027* (2013.01)

(58) Field of Classification Search
None
See application file for complete search history.

(56) References Cited

U.S. PATENT DOCUMENTS

| 4,074,992 A | 2/1978 | Voss |
| 9,701,569 B2 | 7/2017 | Demartino et al. |

(Continued)

FOREIGN PATENT DOCUMENTS

| JP | 2007-284339 A | 11/2007 |
| JP | 2016-529201 A | 9/2016 |

(Continued)

OTHER PUBLICATIONS

Beall et al; "Crystallization and Chemical Strengtheing of Stuffed -Quartz Glass-Ceramics"; Journal of the American Ceramic Society 50.4 (1967): 181-190.
(Continued)

*Primary Examiner* — David Sample
(74) *Attorney, Agent, or Firm* — Jeffrey A. Schmidt

(57) ABSTRACT

Ion-exchanged glass ceramic articles described herein have a stress that decreases with increasing distance according to a substantially linear function from a depth of about 0.07t to a depth of about 0.26t from the outer surface of the ion-exchanged glass ceramic article from a compressive stress to a tensile stress. The stress transitions from the compressive stress to the tensile stress at a depth of from about 0.18t to about 0.25t from the outer surface of the ion-exchanged glass ceramic article. An absolute value of a maximum compressive stress at the outer surface of the ion-exchanged glass article is from 1.8 to 2.2 times an absolute value of a maximum central tension (CT) of the ion-exchanged glass article, and the glass ceramic article has a fracture toughness of 1 MPa$\sqrt{m}$ or more as measured according to the double cantilever beam method.

9 Claims, 21 Drawing Sheets

Related U.S. Application Data

(60) Provisional application No. 62/760,753, filed on Nov. 13, 2018.

(56) References Cited

U.S. PATENT DOCUMENTS

| | | | |
|---|---|---|---|
| 9,809,488 | B2 | 11/2017 | Beall et al. |
| 9,908,811 | B2 | 3/2018 | Gross et al. |
| 2011/0092353 | A1 | 4/2011 | Amin et al. |
| 2012/0135848 | A1* | 5/2012 | Beall .................. C03C 10/0054 65/30.14 |
| 2013/0274085 | A1* | 10/2013 | Beall ....................... C03B 20/00 65/33.1 |
| 2015/0239775 | A1 | 8/2015 | Amin et al. |
| 2016/0102011 | A1 | 4/2016 | Hu et al. |
| 2017/0197876 | A1 | 7/2017 | Oram et al. |
| 2017/0291849 | A1 | 10/2017 | Dejneka et al. |
| 2017/0305786 | A1 | 10/2017 | Roussev et al. |
| 2018/0186686 | A1 | 7/2018 | Beall et al. |
| 2019/0016627 | A1 | 1/2019 | Li et al. |
| 2019/0300422 | A1 | 10/2019 | Guo et al. |
| 2019/0300426 | A1 | 10/2019 | Fu et al. |
| 2020/0017398 | A1 | 1/2020 | Click et al. |
| 2020/0017399 | A1 | 1/2020 | Click et al. |

FOREIGN PATENT DOCUMENTS

| | | |
|---|---|---|
| JP | 2016-536244 A | 11/2016 |
| JP | 2017-530933 A | 10/2017 |
| JP | 2017-537862 A | 12/2017 |
| TW | I620729 B | 4/2018 |
| WO | 2010/002477 A1 | 1/2010 |
| WO | 2017/123596 A1 | 7/2017 |
| WO | 2019/014029 A1 | 1/2019 |
| WO | 2019/191480 A1 | 10/2019 |

OTHER PUBLICATIONS

Gehrke et al; "Effect of Corrosive Media on Crack Growth of Model Glasses and Commerical Silicate Glasses"; Glastech. Ber., 63 255-265 (1990).

Gehrke et al; "Fatigue Limit and Crack Arrest in Alkali-Containing Silicate Glasses"; J. Mater. Sci., 26 5445-5455 (1991).

Guin et al; "Crack Growth Threshold in Soda Lime Silicte Glass: Role of Hold-Time"; J. Non-cryst Solids, 316 12-20 (2003).

Hirao et al; "Microhardness of SiO2 Glass in Various Environments"; J. Am. Ceram. Spc. 70 [7] (1987) 497-502.

Inaba et al; "Non-Destructive Stress Measurement in Douvle Ion-Exchanged Glass Using Optical Guided-Waves and Scattered Light", Journal of the Ceramic Society of Japan 125 [11] 814-820 2017.

International Search Report and Written Opinion of the International Searching Authority; PCT/US2019/060979; dated Jun. 29, 2020; 18 Pages; European Patent Office.

Karstetter et al; "Chemical Strengthening of Glass-Ceramics in the System Li2O—Al2O3—SiO2." Journal of the American Ceramic Society 50.3 (1967): 133-137.

Taiwanese Patent Application No. 108141146, Office Action dated Nov. 26, 2020, 11 pages (English Translation Only); Taiwanese Patent Office.

Taiwanese Patent Application No. 108141146; Notice of Allowance dated Jan. 7, 2021, 2 Pages (English Translation Only); Taiwanese Patent Office.

Walters et al; "Effects of Humidity On the Weathering of Glass"; Glass Surfaces; 1975. 183-199.

Wiederhorn et al; "Crack Growth in Soda-Lime-Silicate Glass Near the Static Fatigue Limit" J. Am. Ceram. Soc., 85 [9] 2287-2292 (2011).

Wiederhorn et al; "Stress Corrosion and Static Fatigue of Glass"; J. Am. Ceram. Soc., 53 [10] 5438 (1970).

Wiederhorn; "Influence of Water Vapor On Crack Propagation in Soda-Lime Glass," J. Am. Ceram. Soc., 50 [8] 407-414 (1967).

Yatongchai; "Strengthening of Li2O—SiO2 Transparent Glass-Ceramics by Ion Exchange" Thesis; 119 Pages; 2005 ISBN 974-533-528-2.

Japanese Patent Application No. 2020-547063, Office Action, dated May 25, 2022, 08 pages (04 pages of English Translation and 04 pages of Original Copy); Japanese Patent Office.

\* cited by examiner

CHEMICALLY STRENGTHENED LITHIUM DISILICATE-PETALITE GLASS-CERAMICS

CROSS-REFERENCE TO RELATED APPLICATIONS

This application is a divisional application and claims the benefit of priority under 35 U.S.C. § 120 of U.S. application Ser. No. 16/682,143 filed on Nov. 13, 2019, which in turn, claims the benefit of and priority to U.S. Provisional Application No. 62/760,753, titled "Chemically Strengthened Lithium Disilicate-Petalite Glass-Ceramics," filed Nov. 13, 2018, the contents of each of which are relied upon and incorporated herein by reference in their entireties.

FIELD

The present specification generally relates to glass articles and, more particularly, to glass ceramic articles having improved chemical durability and damage resistance and methods for forming the same.

BACKGROUND

When glass ceramics having lithium disilicate crystal phases undergo conventional ion exchange processes, a low refractive index layer that is rich in sodium forms on the surface of the glass ceramic. The presence of this sodium-rich surface layer makes the surface of the glass ceramic susceptible to subsurface hydration, which can result in the growth of sodium carbonate crystals on the surface of the glass ceramic, which can, in turn, create surface haze. The sodium-rich surface layer also exhibits low chemical durability, making the glass ceramic susceptible to preferential etching, pitting, and other surface damage.

In addition to altering the properties of the glass ceramic, the presence of the low refractive index layer can blur images generated during FSM imaging, making the use of such images for quality control of the ion exchange process unreliable.

Accordingly, a need exists for glass ceramic articles with improved chemical durability, improved damage resistance, and for methods for improved quality control of ion exchange processes.

SUMMARY

According to a first aspect disclosed herein, an ion-exchanged glass ceramic article has a thickness t, wherein: the glass article comprises a stress that decreases with increasing distance according to a substantially linear function from a depth of about 0.07t to a depth of about 0.26t from the outer surface of the ion-exchanged glass ceramic article toward a centerline; the stress transitions from the compressive stress to the tensile stress at a depth of from about 0.18t to about 0.25t from the outer surface of the ion-exchanged glass ceramic article; and an absolute value of a maximum compressive stress at the outer surface of the ion-exchanged glass ceramic article is from 1.8 to 2.2 times an absolute value of a maximum central tension (CT) of the ion-exchanged glass ceramic article; and the ion-exchanged glass ceramic article has a fracture toughness of 1 MPa$\sqrt{}$m or more as measured according to the double cantilever beam method.

According to a second aspect disclosed herein, the ion-exchanged glass ceramic article includes the ion-exchanged glass ceramic article according to the first aspect, wherein the maximum central tension is 70 MPa or more.

According to a third aspect disclosed herein, the ion-exchanged glass ceramic article includes the ion-exchanged glass ceramic article according to any preceding aspect, wherein the maximum central tension is from 80 MPa to 140 MPa.

According to a fourth aspect disclosed herein, the ion-exchanged glass ceramic article includes the ion-exchanged glass ceramic article according to any preceding aspect, wherein the maximum compressive stress is from 180 MPa to 350 MPa.

According to a fifth aspect disclosed herein, the ion-exchanged glass ceramic article includes the ion-exchanged glass ceramic article according to any preceding aspect, wherein the fracture toughness is from 1 MPa$\sqrt{}$m to 1.5 MPa$\sqrt{}$m as measured according to the double cantilever beam method.

According to a sixth aspect disclosed herein, the ion-exchanged glass ceramic article includes the ion-exchanged glass ceramic article according to any preceding aspect, wherein the ion-exchanged glass ceramic article has a $Na_2O$ concentration of less than 10 mol % at the outer surface.

According to a seventh aspect disclosed herein, an ion-exchanged glass ceramic article has a thickness t, wherein: a concentration of Li ions increases with increasing distance from an outer surface of the ion-exchanged glass ceramic article from a surface Li ion concentration to a maximum Li ion concentration, wherein a difference between the surface Li ion concentration and the maximum Li ion concentration is less than 5 mol %; a concentration of Na ions increases and then decreases with increasing distance from an outer surface of the ion-exchanged glass ceramic article from a surface Na ion concentration to a minimum Na ion concentration, wherein a difference between the surface Na ion concentration and the minimum Na ion concentration is less than 5 mol %, the surface Na ion concentration being less than 10 mol %; and the ion-exchanged glass ceramic article has a fracture toughness of greater than 1 MPa$\sqrt{}$m as measured according to the double cantilever beam method.

According to an eighth aspect disclosed herein, the ion-exchanged glass ceramic article includes the ion-exchanged glass ceramic article according to the seventh aspect, wherein the concentration of Na ions is greater than 0 mol % throughout the thickness t of the ion-exchanged glass ceramic article.

According to a ninth aspect disclosed herein, the ion-exchanged glass ceramic article includes the ion-exchanged glass ceramic article according to the seventh or eighth aspects, wherein the concentration of Na ions is greater than 0 mol % and less than 2.5 mol %.

According to a tenth aspect disclosed herein, the ion-exchanged glass ceramic article includes the ion-exchanged glass ceramic article according to any of the seventh through ninth aspects, wherein the maximum concentration of Li ions is from 19 mol % to 32 mol %.

According to an eleventh aspect disclosed herein, the ion-exchanged glass ceramic article includes the ion-exchanged glass ceramic article according to any of the seventh through tenth aspects, wherein the fracture toughness is from 1 MPa$\sqrt{}$m to 1.5 MPa$\sqrt{}$m as measured according to the double cantilever beam method.

According to a twelfth aspect disclosed herein, the ion-exchanged glass ceramic article includes the ion-exchanged glass ceramic article according to any of the seventh through eleventh aspects, further comprising greater than 0 mol % to 6 mol % $Al_2O_3$.

According to a thirteenth aspect disclosed herein, the ion-exchanged glass ceramic article includes the ion-exchanged glass ceramic article according to any of the seventh through twelfth aspects, further comprising from 0.7 mol % to 2.2 mol % $P_2O_5$.

According to a fourteenth aspect disclosed herein, the ion-exchanged glass ceramic article includes the ion-exchanged glass ceramic article according to any of the seventh through thirteenth aspects, further comprising from 1.7 mol % to 4.5 mol % $ZrO_2$.

According to a fifteenth aspect disclosed herein, the ion-exchanged glass ceramic article includes the ion-exchanged glass ceramic article according to any of the seventh through fourteenth aspects, further comprising from 60 mol % to 72 mol % $SiO_2$.

According to a sixteenth aspect disclosed herein, an ion-exchanged glass ceramic article comprises a residual glass content of from 1% to 30% and from 70% to 99% of a crystalline phase selected from the group consisting of lithium disilicate, petalite, β-quartz, β-spodumene solid solution, and combinations thereof; the ion-exchanged glass ceramic article has a thickness t and comprises a stress that decreases with increasing distance from an outer surface of the ion-exchanged glass ceramic article toward a centerline, wherein: the stress decreases according to a substantially linear function from a depth of about 0.07t to a depth of about 0.26t from the outer surface of the ion-exchanged glass ceramic article; the stress transitions from a compressive stress to a tensile stress at a depth of from about 0.18t to about 0.25t from the outer surface of the ion-exchanged glass ceramic article; and a maximum compressive stress at the outer surface of the ion-exchanged glass article is from 1.8 to 2.2 times the value of the maximum central tension (CT) of the ion-exchanged glass article.

According to a seventeenth aspect disclosed herein, the ion-exchanged glass ceramic article includes the ion-exchanged glass ceramic article according to the sixteenth aspect, wherein the ion-exchanged glass ceramic article has a fracture toughness of from 1 MPa√m to 1.5 MPa√m as measured according to the double cantilever beam method.

According to an eighteenth aspect disclosed herein, the ion-exchanged glass ceramic article includes the ion-exchanged glass ceramic article according to the sixteenth or seventeenth aspects, wherein the ion-exchanged glass ceramic is opaque.

According to a nineteenth aspect disclosed herein, the ion-exchanged glass ceramic article includes the ion-exchanged glass ceramic article according to any of the sixteenth through eighteenth aspects, wherein the maximum compressive stress is from 180 MPa to 350 MPa.

According to a twentieth aspect disclosed herein, the ion-exchanged glass ceramic article includes the ion-exchanged glass ceramic article according to any of the sixteenth through nineteenth aspects, wherein the ion-exchanged glass ceramic article has a $Na_2O$ concentration of less than 10 mol % at the outer surface.

According to a twenty-first aspect disclosed herein, a method of strengthening a glass ceramic article having a crystal phase selected from the group consisting of petalite, lithium disilicate, and combinations thereof comprises: applying an ion exchange medium to the glass ceramic article, wherein the ion exchange medium comprises greater than 0 wt % and less than or equal to 20 wt % $NaNO_3$, from 80 wt % to less than 100 wt % $KNO_3$, and from 0.01 wt % to 0.5 wt % $LiNO_3$.

According to a twenty-second aspect disclosed herein, the method includes the method according to the twenty-first aspect, wherein the ion exchange medium has a temperature of from 380° C. to 550° C.

According to a twenty-third aspect disclosed herein, the method includes the method according to the twenty-first or twenty-second aspects, wherein the ion exchange medium is applied to the glass ceramic article for a time of from 2 hours to 16 hours.

According to a twenty-fourth aspect disclosed herein, the method includes the method according to any of the twenty-first through twenty-third aspects, wherein the ion exchange medium is a second ion exchange medium, and the method further comprises: applying a first ion exchange medium to the glass ceramic article wherein the first ion exchange medium comprises $NaNO_3$, $KNO_3$, and from 0.01 wt % to 0.5 wt % $LiNO_3$, and wherein applying the second ion exchange medium is performed after applying the first ion exchange medium.

According to a twenty-fifth aspect disclosed herein, the method includes the method according to the twenty-fourth aspect, wherein the first ion exchange medium comprises greater than 20 wt % $NaNO_3$.

According to a twenty-sixth aspect disclosed herein, the method includes the method according to the twenty-fourth or twenty-fifth aspects, wherein the second ion exchange medium comprises greater than 95 wt % and less than 100 wt % $KNO_3$ and greater than 0 wt % and less than 5 wt % $NaNO_3$.

According to a twenty-seventh aspect disclosed herein, a method of strengthening a glass ceramic article having a crystal phase selected from the group consisting of petalite, lithium disilicate, and combinations thereof, comprises: applying an ion exchange medium to the glass ceramic article, wherein the ion exchange medium comprises greater than 20 wt % and less than or equal to 50 wt % $NaNO_3$, from 50 wt % to less than 80 wt % $KNO_3$, and from 0.01 wt % to 0.5 wt % $LiNO_3$.

According to a twenty-eighth aspect disclosed herein, the method includes the method according to the twenty-seventh aspect, wherein the ion exchange medium has a temperature of from 380° C. to 550° C.

According to a twenty-ninth aspect disclosed herein, the method includes the method according to the twenty-seventh or twenty-eighth aspects, wherein the ion exchange medium is applied to the glass ceramic article for a time of from 2 hours to 16 hours.

According to a thirtieth aspect disclosed herein, the method includes the method according to any of the twenty-seventh through twenty-ninth aspects, wherein the ion exchange medium comprises from 30 wt % to 50 wt % $NaNO_3$ and from 50 wt % to 70 wt % $KNO_3$.

According to a thirty-first aspect disclosed herein, a consumer electronic product comprises: a housing comprising a front surface, a back surface and side surfaces; electrical components at least partially within the housing, the electrical components comprising a controller, a memory, and a display, the display at or adjacent the front surface of the housing; and a cover substrate disposed over the display, wherein at least one of a portion of the housing or the cover substrate comprises the ion exchanged glass ceramic article of any one of the first through twentieth aspects.

Additional features and advantages will be set forth in the detailed description, which follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
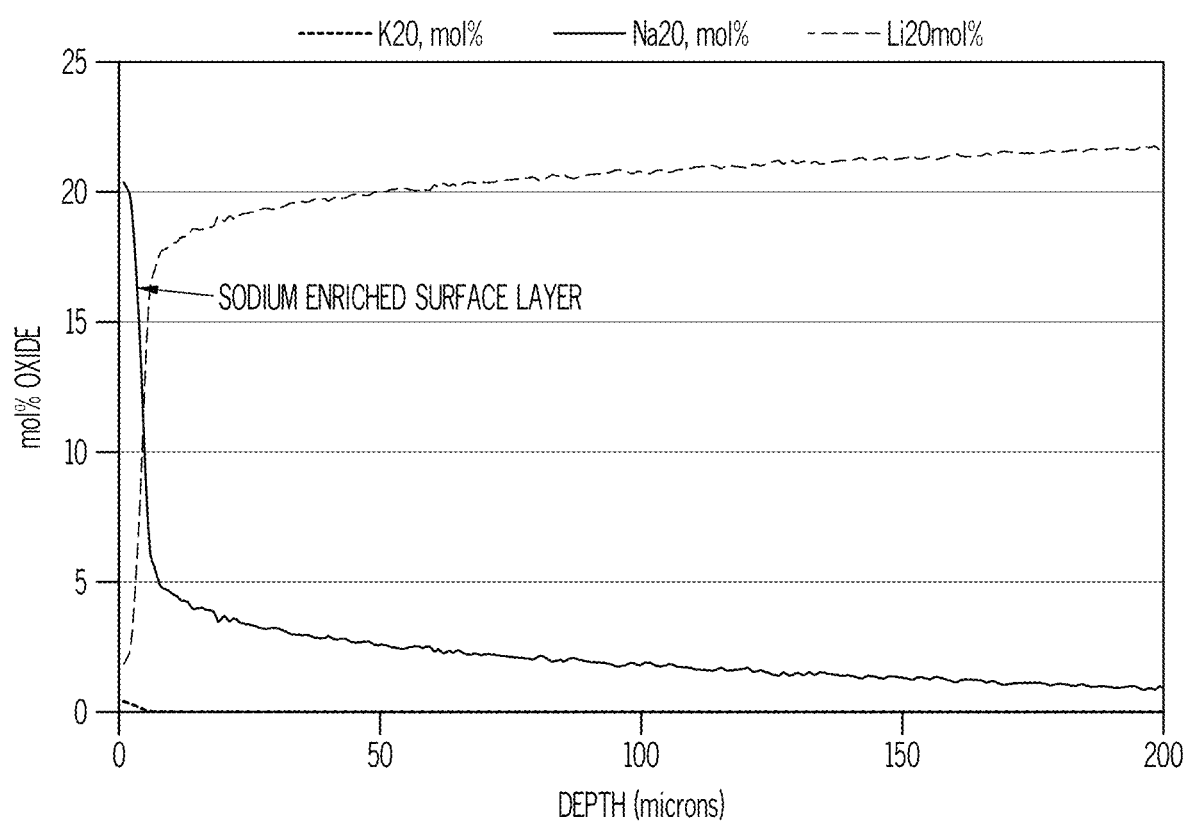
FIG. 1 is a plot of concentration (Y-axis, in mol % of the oxide) as a function of depth into the thickness of the sample from the surface (X-axis; in micrometers, microns, or μm) of sodium, lithium, and potassium elemental distribution in a glass ceramic substrate formed from Composition A when the glass ceramic substrate is subjected to a conventional ion exchange treatment.

Reference will now be made in detail to various embodiments, examples of which are illustrated in the accompany- Definitions and Measurement Techniques Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. When such a range is expressed, embodiments include from the one particular value and/or to the other particular value. Similarly, when values are expressed as approximations, by use of the antecedent "about," it will be understood that the particular value forms another embodiment. Whether or not a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example, within about 5% of each other, or within about 2% of each other.

Directional terms as used herein—for example up, down, right, left, front, back, top, bottom—are made only with reference to the figures as drawn and are not intended to imply absolute orientation.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

As used herein, "depth of compression" or "DOC" refers to the depth of a compressive stress (CS) layer and is the depth at which the stress within a glass ceramic article changes from compressive stress to tensile stress and has a stress value of zero. Compressive stress is expressed herein as a positive (>0) stress and tensile stress is expressed as a negative (<0) stress. Throughout this description, however, and unless otherwise noted, numerical values for tensile stress and compressive stress are expressed as a positive or absolute value. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

Various measurements described herein, and in particular, compressive stress, are measured by surface stress meter (FSM) using commercially available instruments for example the FSM-6000, manufactured by Orihara Industrial Co., Ltd. (Japan). As will be discussed in greater detail herein, surface stress measurements rely upon the accurate measurement of the stress optical coefficient (SOC), which is related to the birefringence of the glass-ceramic. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. If a low-index layer is formed, then the surface compressive stress (and the compressive stress of the low-index layer) is measured by the birefringence of the first transmission (coupling) resonance of the low-index layer in a prism coupling measurement and measures the depth of layer of the low-index layer by the spacing between the first and second transmission resonances or the breadth of the first transmission resonance.

A graphical representation of the stress profile from about the knee to the maximum CT can be derived by the refracted near-field (RNF) method described in U.S. Pat. No. 8,854,623, entitled "Systems and methods for measuring a profile characteristic of a glass sample", which is hereby incorporated by reference in its entirety. The RNF graphical representation is force balanced and calibrated to the maximum central tension (also called peak central tension) value provided by a SCALP measurement. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

A graphical representation of the stress profile may be derived using a combination of RNF, SCALP, and FSM. The FSM is used to derive a graphical representation of the portion of the stress profile near the surface, whereas RNF is used together with the SCALP to derive a graphical representation of the shape of the portion of the stress profile beyond the depth of the knee and through the tensile stress portion of the stress profile. The portions derived from FSM, RNF and SCALP, are stitched together to provide a representation of the full stress profile as follows. The RNF is force balanced and calibrated to match the SCALP central tension. Force balance is performed by shifting the neutral axis to match the tensile-stress area under the neutral axis of the representation with the compressive-stress area above the neutral axis of the representation. After force-balancing and calibrating the RNF, the surface spike representation obtained from the FSM is spliced into the RNF representation of the profile, replacing the corresponding portion of the RNF representation. The process of force-balancing, calibrating to SCALP central tension, and splicing is repeated until convergence is reached, that is, the representation of the profile is substantially unchanged with further repetitions of the process. As appropriate, and where necessary, standard smoothing techniques may be used so as to remove measurement noise.

Concentration profiles of various constituent components in the glass, for example alkali constituent components, were measured by electron probe microanalysis (EPMA). EPMA may be utilized, for example, to discern compressive stress in the glass due to the ion exchange of alkali ions into the glass. Average surface concentration levels (e.g., within the first 100 nm from the surface of the glass) were measured using glow discharge optical emission spectrometry (GdOES) in some embodiments.

Figure 17:
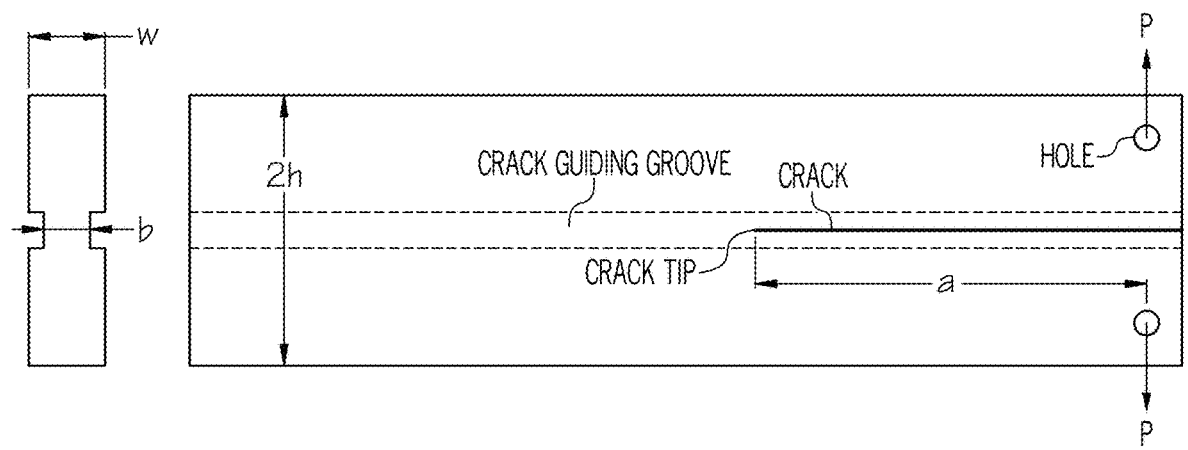
FIG. 17 is a schematic illustration of a set up used in the double cantilever beam method for measuring fracture toughness.

Fracture toughness measurements are performed using the double cantilever beam (DCB) method. The DCB specimen geometry is shown in FIG. 17 with key parameters being the crack length a, applied load P, cross-sectional dimensions w and 2h, and the thickness of the crack-guiding groove, b. Samples, formed from a composition the same as that to be tested but without that sample having undergone ion-exchange, are prepared by cutting glass into rectangles of width 2h=1.25 centimeters (cm) and a thickness ranging from, w=0.3 millimeters (mm) to 1 mm, with the overall length of the sample varying from 5 cm to 10 cm. Each glass sample has a hole drilled on both ends with a diamond drill to provide a means of attaching the sample to a sample holder and to the load. A crack "guiding groove" b is cut down the length of the sample on both flat faces using a wafer dicing saw with a diamond blade, leaving a "web" of material, approximately half the total plate thickness (b in FIG. 17), with a height of 180 μm being the blade thickness or kerf. The high precision dimensional tolerances of the dicing saw allow for minimal sample-to-sample variation. The dicing saw is also used to cut an initial crack of a=15 mm, which creates a very thin wedge of material near the crack tip (due to the blade curvature) allowing for easier crack initiation in the sample.

A crack-guiding groove b maintains the crack within a plane and prevents growth off the crack plane. Samples are mounted in a metal sample holder by hooking into the bottom hole of the sample using steel wire. The samples are also supported on the opposite end to keep the samples level under low loading conditions. A spring in series with a load cell (FUTEK, LSB200) is hooked to the upper hole which is then extended, to gradually apply load, using rope and a high precision slide. The crack is monitored using a microscope (5-10 μm resolution) attached to a digital camera and a computer.

By maintaining tight tolerances on the dimensional parameters, the applied stress intensity, $K_P$, is calculated using the following equation (1) with the input parameters shown in FIG. 17:

$$K_P = \left[\frac{Pa}{(wb)^{0.5} h^{0.5}}\right]\left[3.47 + 2.32\frac{h}{a}\right] \quad (1)$$

For each sample, a crack is initiated at the tip of the web, and then the starter crack is carefully sub-critically grown until the ratio of dimensions a/h is greater than 1.5, which is used in equation (1) to accurately calculate stress intensity. At this point, the crack length, a, is measured and recorded using a traveling microscope with 5 μm resolution. A drop of Toluene is then dropped into the crack groove, and is wicked along the entire length of groove by capillary forces, pinning the crack from moving unless it is loaded to the fracture toughness. Toluene, heavy mineral oil, silicone oil, and other organics act as a barrier between atmospheric water and glass surfaces and prevent sub-critical crack growth. The load is then increased until sample fracture occurs, and the critical stress intensity is calculated from the failure load and sample dimensions. All samples are measured post-testing using optical microscopy to ensure correct sample dimensions were used in K calculations. When fracture toughness of an ion-exchanged sample is to be tested, the measurement as described above is performed on a sample having the same composition as that to be tested but before that sample to be tested had undergone ion-exchange.

The term "formed from" can mean one or more of comprises, consists essentially of, or consists of. For example, a component that is formed from a particular material can comprise the particular material, consist essentially of the particular material, or consist of the particular material.

General Overview of Glass Ceramic Articles

Glass ceramic articles of various embodiments include petalite and lithium disilicate as the primary crystalline phases and can optionally further include lithium aluminosilicate (LAS) crystal phases. The glass ceramic articles include a surface layer with a sodium content of less than or equal to 10 mol %. Following an ion exchange treatment, the glass ceramic articles described herein exhibit an increased stored energy (central tension), an increased fracture toughness, and are non-frangible.

Petalite ($LiAlSi_4O_{10}$) is a monoclinic crystal possessing a three-dimensional framework structure with a layered structure having folded $Si_2O_5$ layers linked by Li and Al tetrahedral. The Li is in tetrahedral coordination with oxygen. Petalite is a lithium source and is used as a low thermal expansion phase to improve the thermal downshock resistance of glass ceramic or ceramic parts. Lithium disilicate ($Li_2Si_2O_5$) is an orthorhombic crystal based on corrugated sheets of $\{Si_2O_5\}$ tetrahedral arrays. The crystals are typically tabular or lath-like in shape, with pronounced cleavage planes. Glass ceramics based on lithium disilicate have highly desirable mechanical properties, including high body strength and fracture toughness, due to their microstructures of randomly-oriented interlocked crystals. This crystal structure forces cracks to propagate through the material via tortuous paths around the interlocked crystals thereby improving the strength and fracture toughness.

There are two broad families of lithium disilicate glass ceramics. The first group comprises those that are doped with ceria and a noble metal for example silver. These can be photosensitively nucleated via UV light and subsequently heat-treated to produce strong glass ceramics for example Fotoceram®. The second family of lithium disilicate glass ceramics is nucleated by the addition of $P_2O_5$, wherein the nucleating phase is $Li_3PO_4$. $P_2O_5$-nucleated lithium disilicate glass ceramics have been developed for applications as varied as high-temperature sealing materials, disks for computer hard drives, transparent armor, and dental applications.

The glasses and glass ceramics described herein may be generically described as lithium-containing aluminosilicate glasses or glass ceramics and comprise $SiO_2$, $Al_2O_3$, and $Li_2O$. In addition to $SiO_2$, $Al_2O_3$, and $Li_2O$, the glasses and glass ceramics embodied herein may further contain alkali oxides, for example $Na_2O$, $K_2O$, $Rb_2O$, or $Cs_2O$, as well as $P_2O_5$ and $ZrO_2$, and a number of other components as described below. In one or more embodiments, the crystallite phases include petalite and lithium disilicate, but β-spodumene solid solution, β-quartz, metasilicate, lithium phosphate, and zirconium may also be present depending on the compositions of the precursor glass. In some embodiments, the glass ceramic composition has a residual glass content of 1 to 30 wt %, 1 to 25 wt %, 1 to 20 wt %, 1 to 15 wt %, 1 to 10 wt %, 1 to 5 wt %, 5 to 30 wt %, 5 to 25 wt %, 5 to 20 wt %, 5 to 15 wt %, 5 to 10 wt %, 10 to 30 wt %, 10 to 25 wt %, 10 to 20 wt %, 10 to 15 wt %, 15 to 30 wt %, 15 to 25 wt %, 15 to 20 wt %, 20 to 30 wt %, 20 to 25 wt %, or 25 to 30 wt %, as determined according to Rietveld analysis of the XRD spectrum. It should be understood that the residual glass content may be within a sub-range formed from any and all of the foregoing endpoints. Accordingly, in some embodiments, the glass ceramic article from 70 to 99 wt %, from 70 to 95 wt %, from 70 to 90 wt %, from 70 to 85 wt %, from 70 to 80 wt %, from 70 to 75 wt %, from 75 to 99 wt %, from 75 to 95 wt %, from 75 to 90 wt %, from 75 to 85 wt %, from 75 to 80 wt %, from 80 to 99 wt %, from 80 to 95 wt %, from 80 to 90 wt %, from 80 to 85 wt %, from 85 to 99 wt %, from 85 to 95 wt %, from 85 to 90 wt %, from 90 to 99 wt %, from 90 to 95 wt %, or from 95 to 99 wt % of a crystalline phase.

$SiO_2$ is the primary glass former and can function to stabilize the networking structure of glasses and glass ceramics. In some embodiments, the glass or glass ceramic composition comprises from 55 to 80 mol % $SiO_2$. In some embodiments, the glass or glass ceramic composition comprises from 60 to 72 mol % $SiO_2$. In some embodiments, the glass or glass ceramic composition can comprise from 55 to 80 mol %, 55 to 77 mol %, 55 to 75 mol %, 55 to 73 mol %, 60 to 80 mol %, 60 to 77 mol %, 60 to 75 mol %, 60 to 73 mol %, 60 to 72 mol % $SiO_2$, or any and all sub-ranges formed from any of these endpoints.

The concentration of $SiO_2$ should be sufficiently high (greater than 55 mol %) in order to form petalite crystal phase when the precursor glass is heat treated to convert to a glass ceramic. In other words, the concentration $SiO_2$, should be high enough to yield both the lithium silicate and petalite phases. The amount of $SiO_2$ may be limited to control melting temperature (200 poise temperature), as the melting temperature of pure $SiO_2$ or high-$SiO_2$ glasses is undesirably high.

Like $SiO_2$, $Al_2O_3$ may also provide stabilization to the network and also provides improved mechanical properties and chemical durability. If the amount of $Al_2O_3$ is too high, however, the fraction of lithium silicate crystals may be decreased, possibly to the extent that an interlocking structure cannot be formed. The amount of $Al_2O_3$ can be tailored to control viscosity. Further, if the amount of $Al_2O_3$ is too high, the viscosity of the melt is also generally increased. In some embodiments, the glass or glass ceramic composition can comprise from 0 to 6 mol % $Al_2O_3$. In some embodiments, the glass or glass ceramic composition can comprise from 0 to 6 mol %, 0 to 5 mol %, 0 to 4 mol %, 0 to 3 mol %, 0 to 2 mol %, 0 to 1 mol %, greater than 0 to 6 mol %, greater than 0 to 5 mol %, greater than 0 to 4 mol %, greater than 0 to 3 mol %, greater than 0 to 2 mol %, greater than 0 to 1 mol %, 0.5 to 6 mol %, 0.5 to 5 mol %, 0.5 to 4 mol %, 0.5 to 3 mol %, 0.5 to 2 mol %, 0.5 to 1 mol %, 1 to 6 mol %, 1 to 5 mol %, 1 to 4 mol %, 1 to 3 mol %, 1 to 2 mol %, 2 to 6 mol %, 2 to 5 mol %, 2 to 4 mol %, 2 to 3 mol %, 3 to 6 mol %, 3 to 5 mol %, 3 to 4 mol %, 4 to 6 mol %, 4 to 5 mol %, or 5 to 6 mol % $Al_2O_3$, or any and all sub-ranges formed from any of these endpoints.

In the glass and glass ceramics described herein, $Li_2O$ aids in forming both petalite and lithium silicate crystal phases. To obtain petalite and lithium silicate as the predominant crystal phases, it is desirable to have 14 mol % or more $Li_2O$ in the composition. However, if the concentration of $Li_2O$ is too high—greater than 36 mol %—the composition becomes very fluid and the delivery viscosity is low enough that a sheet cannot be formed. In some embodied compositions, the glass or glass ceramic can comprise from 20 mol % to 32 mol % $Li_2O$. In some embodiments, the glass or glass ceramic composition can comprise from 20 to 32 mol %, 20 to 30 mol %, 20 to 28 mol %, 20 to 26 mol %, 20 to 24 mol %, 22 to 32 mol %, 22 to 30 mol %, 22 to 28 mol %, 22 to 26 mol %, 22 to 24 mol %, 24 to 32 mol %, 24 to 30 mol %, 24 to 28 mol %, 24 to 26 mol %, 26 to 32 mol %, 26 to 30 mol %, 26 to 28 mol %, 28 to 32 mol %, 28 to 30 mol %, or 30 to 32 mol % $Li_2O$, or any and all sub-ranges formed from any of these endpoints.

As noted above, $Li_2O$ is generally useful for forming the embodied glass ceramics, but the other alkali oxides (e.g., $K_2O$ and $Na_2O$) tend to decrease glass ceramic formation and form an aluminosilicate residual glass in the glass ceramic rather than a ceramic phase. It has been found that more than 10 mol % $Na_2O$ or $K_2O$, or combinations thereof, leads to an undesirable amount of residual glass which can lead to deformation during crystallization and undesirable microstructures from a mechanical property perspective. Additionally, levels of $Na_2O$ that are greater than 10 mol % can render the surface susceptible to subsurface hydration, which can result in the growth of sodium carbonate crystals on the surface. Such sodium carbonate crystals can, in turn, create a surface haze on the glass ceramic. However, levels below 5 mol % may be advantageous for ion exchange, enabling higher surface compression and/or metrology. In general, the compositions described herein have low amounts of non-lithium alkali oxides. In some embodiments, the glass or glass ceramic composition can comprise from 0 to 5 mol % $R_2O$, wherein R is one or more of the alkali cations Na and K. In some embodiments, the glass or glass ceramic composition can comprise from 1 to 4 mol % $R_2O$, wherein R is one or more of the alkali cations Na and K. In some embodiments, the glass or glass ceramic composition can comprise from 0 to 5 mol %, 0 to 4 mol %, 0 to 3 mol %, 0 to 2 mol %, 0 to 1 mol %, >0 to 5 mol %, >0 to 4 mol %, >0 to 3 mol %, >0 to 2 mol %, >0 to 1 mol %, 1 to 5 mol %, 1 to 4 mol %, 1 to 3 mol %, 1 to 2 mol %, 2 to 5 mol %, 2 to 4 mol %, 2 to 3 mol %, 3 to 5 mol %, 3 to 4 mol %, or 4 to 5 mol % $Na_2O$, $K_2O$, or combinations thereof. It should be understood that the $R_2O$ concentration may be within a sub-range formed from any and all of the foregoing endpoints.

The glass and glass ceramic compositions can include $P_2O_5$. $P_2O_5$ can function as a nucleating agent to produce bulk nucleation of the crystalline phase(s) from the glass and glass ceramic compositions. If the concentration of $P_2O_5$ is too low, the precursor glass does crystallize, but only at higher temperatures (due to a lower viscosity); however, if the concentration of $P_2O_5$ is too high, devitrification upon cooling during precursor glass forming can be difficult to control. Embodiments can comprise from >0 to 3 mol % $P_2O_5$. Other embodiments can comprise 0.7 to 2.2 mol %

$P_2O_5$. Embodied compositions can comprise from >0 to 3 mol %, >0 to 2.5 mol %, >0 to 2.2 mol %, >0 to 2 mol %, >0 to 1.5 mol %, >0 to 1.2 mol %, >0 to 1 mol %, 0.7 to 3 mol %, 0.7 to 2.5 mol %, 0.7 to 2.2 mol %, 0.7 to 2 mol %, 0.7 to 1.5 mol %, 0.7 to 1.2 mol %, 0.7 to 1 mol %, 1 to 3 mol %, 1 to 2.5 mol %, 1 to 2.2 mol %, 1 to 2 mol %, 1 to 1.5 mol %, 1 to 1.2 mol %, 1.2 to 3 mol %, 1.2 to 2.5 mol %, 1.2 to 2.2 mol %, 1.2 to 2 mol %, 1.5 to 3 mol %, 1.5 to 2.5 mol %, 1.5 to 2 mol %, 2 to 3 mol %, 2 to 2.5 mol %, 2.2 to 3 mol %, 2.5 to 3 mol % $P_2O_5$, or any and all sub-ranges formed from any of these endpoints.

In the glass and glass ceramics described herein, additions of $ZrO_2$ can improve the stability of $Li_2O$—$Al_2O_3$—$SiO_2$—$P_2O_5$ glass by significantly reducing glass devitrification during forming and decreasing the liquidus temperature. At concentrations greater than 4 mol %, $ZrO_2$ can form a primary liquidus phase at a high temperature, which significantly lowers the liquidus viscosity. Transparent glasses can be formed when the glass contains over 1 mol % $ZrO_2$. The addition of $ZrO_2$ can also decrease the petalite grain size, which aids in the formation of a transparent glass ceramic. In some embodiments, the glass or glass ceramic composition can comprise from 1.7 to 4.5 mol % $ZrO_2$. In some embodiments, the glass or glass ceramic composition can comprise from 2 to 4 mol % $ZrO_2$. In some embodiments, the glass or glass ceramic composition can comprise from 1.7 to 4.5 mol %, 1.7 to 4 mol %, 1.7 to 3.5 mol %, 1.7 to 3 mol %, 1.7 to 2.5 mol %, 1.7 to 2 mol %, 2 to 4.5 mol %, 2 to 4 mol %, 2 to 3.5 mol %, 2 to 3 mol %, 2 to 2.5 mol %, 2.5 to 4.5 mol %, 2.5 to 4 mol %, 2.5 to 3.5 mol %, 2.5 to 3 mol %, 3 to 4.5 mol %, 3 to 4 mol %, 3 to 3.5 mol %, 3.5 to 4.5 mol %, 3.5 to 4 mol %, 4 to 4.5 mol % $ZrO_2$, or any and all sub-ranges formed from any of these endpoints.

$B_2O_3$ decreases the melting temperature of the glass precursor. Furthermore, the addition of $B_2O_3$ in the precursor glass and, thus, the glass ceramics helps achieve an interlocking crystal microstructure and can also improve the damage resistance of the glass ceramic. When boron in the residual glass is not charge balanced by alkali oxides or divalent cation oxides (for example MgO, CaO, SrO, BaO, and ZnO), it will be in trigonal-coordination state (or three-coordinated boron), which opens up the structure of the glass. The network around these three-coordinated boron atoms is not as rigid as tetrahedrally coordinated (or four-coordinated) boron. Without being bound by theory, it is believed that precursor glasses and glass ceramics that include three-coordinated boron can tolerate some degree of deformation before crack formation compared to four-coordinated boron. By tolerating some deformation, the Vickers indentation crack initiation threshold values increase. Fracture toughness of the precursor glasses and glass ceramics that include three-coordinated boron may also increase. Without being bound by theory, it is believed that the presence of boron in the residual glass of the glass ceramic (and precursor glass) lowers the viscosity of the residual glass (or precursor glass), which facilitates the growth of lithium silicate crystals, especially large crystals having a high aspect ratio. A greater amount of three-coordinated boron (in relation to four-coordinated boron) is believed to result in glass ceramics that exhibit a greater Vickers indentation crack initiation load. In some embodiments, the amount of three-coordinated boron (as a percent of total $B_2O_3$) may be 40% or greater, 50% or greater, 75% or greater, 85% or greater, or even 95% or greater. The amount of boron in general should be controlled to maintain chemical durability and mechanical strength of the cerammed bulk glass ceramic. In other words, the amount of boron should be limited to less than 5 mol % in order to maintain chemical durability and mechanical strength.

In one or more embodiments, the glasses and glass ceramics herein can comprise from 0 to 2 mol % $B_2O_3$. In some embodiments, the glass or glass ceramic composition can comprise from 0 to 2 mol %, 0 to 1.5 mol %, 0 to 1 mol %, 0 to 0.5 mol %, >0 to 2 mol %, >0 to 1.5 mol %, >0 to 1 mol %, >0 to 0.5 mol %, 0.5 to 2 mol %, 0.5 to 1.5 mol %, 0.5 to 1 mol %, 1 to 2 mol %, 1 to 1.5 mol %, 1.5 to 2 mol % $B_2O_3$, or any and all sub-ranges formed from any of these endpoints.

MgO can enter petalite crystals in a partial solid solution. In one or more embodiments, the glasses and glass ceramics described herein can comprise from 0 to 1 mol %, 0 to 0.75 mol %, 0 to 0.5 mol %, 0 to 0.25 mol %, >0 to 1 mol %, >0 to 0.75 mol %, >0 to 0.5 mol %, >0 to 0.25 mol %, 0.25 to 1 mol %, 0.25 to 0.75 mol %, 0.25 to 0.5 mol %, 0.5 to 1 mol %, 0.5 to 0.75 mol %, 0.75 to 1 mol % MgO, or any and all sub-ranges formed from any of these endpoints.

ZnO can enter petalite crystals in a partial solid solution. In one or more embodiments, the glasses and glass ceramics herein can comprise from 0 to 1 mol % ZnO. In one or more embodiments, the glasses and glass ceramics described herein can comprise from 0 to 1 mol %, 0 to 0.75 mol %, 0 to 0.5 mol %, 0 to 0.25 mol %, >0 to 1 mol %, >0 to 0.75 mol %, >0 to 0.5 mol %, >0 to 0.25 mol %, 0.25 to 1 mol %, 0.25 to 0.75 mol %, 0.25 to 0.5 mol %, 0.5 to 1 mol %, 0.5 to 0.75 mol %, 0.75 to 1 mol % ZnO, or any and all sub-ranges formed from any of these endpoints.

In one or more embodiments, the glasses and glass ceramics can comprise from 0 to 0.5 mol % $SnO_2$, or another fining agent. In some embodiments, the glass or glass ceramic composition can comprise from 0 to 0.5 mol %, 0 to 0.4 mol %, 0 to 0.3 mol %, 0 to 0.2 mol %, 0 to 0.1 mol %, 0.05 to 0.5 mol %, 0.05 to 0.4 mol %, 0.05 to 0.3 mol %, 0.05 to 0.2 mol %, 0.05 to 0.1 mol %, 0.1 to 0.5 mol %, 0.1 to 0.4 mol %, 0.1 to 0.3 mol %, 0.1 to 0.2 mol %, 0.2 to 0.5 mol %, 0.2 to 0.4 mol %, 0.2 to 0.3 mol %, 0.3 to 0.5 mol %, 0.3 to 0.4 mol %, or 0.4 to 0.5 mol % $SnO_2$, or any and all sub-ranges formed from any of these endpoints.

As a result of the raw materials and/or equipment used to produce the glass or glass ceramic composition of various embodiments, certain impurities or components that are not intentionally added may be present in the final glass or glass ceramic composition. Such materials are present in the glass or glass ceramic composition in minor amounts and are referred to herein as "tramp materials." As used herein, "tramp materials" may be present in an amount of less than 1000 ppm. In some embodiments, the glass or glass ceramic composition may further include tramp materials, for example $TiO_2$, MnO, ZnO, $Nb_2O_5$, $MoO_3$, $Ta_2O_5$, $WO_3$, $Y_2O_3$, $La_2O_3$, $HfO_2$, CdO, $As_2O_3$, $Sb_2O_3$, sulfur-based compounds, for example sulfates, halogens, or combinations thereof. In some embodiments, antimicrobial components, chemical fining agents, or other additional components may be included in the glass or glass ceramic composition.

In some embodiments, the glasses and/or glass ceramics described herein can be manufactured into sheets via processes, including, but not limited to, fusion forming, slot draw, float, rolling, and other sheet-forming processes known to those in the art.

The articles formed from the glass ceramics described herein can be any suitable thickness, which may vary depending on the particular application for use of the glass ceramic. Glass sheet and or glass ceramic embodiments may have a thickness of from 0.4 mm to 10 mm. Some embodiments may have a thickness of 6 mm or less, 5 mm or less, 3 mm or less, 2 mm or less, 1.0 mm or less, 750 µm or less, 500 µm or less, or 250 µm or less. Some glass or glass ceramic sheet embodiments may have a thickness of from 200 µm to 5 mm, 500 µm to 5 mm, 200 µm to 4 mm, 200 µm to 2 mm, 400 µm to 5 mm, or 400 µm to 2 mm. Some glass or glass ceramic sheet embodiments may have a thickness of from 250 µm to 5 mm, 400 µm to 4 mm, 350 µm to 3 mm, 450 µm to 2 mm, 500 µm to 1 mm, or 550 µm to 750 µm. In some embodiments, the thickness may be from 3 mm to 6 mm or from 0.8 mm to 3 mm. It should be understood that the thickness of the article may be within a sub-range formed from any and all of the foregoing endpoints.

In various embodiments described herein, the glass ceramic is chemically strengthened, for example by an ion exchange treatment, to improve chemical durability and damage resistance of glass ceramics while enabling metrology and preventing the formation of a haze layer under high humidity conditions.

When the glass ceramics described herein are subjected to conventional ion exchange treatments (e.g., ion exchange treatments with a molten sodium nitrate, potassium nitrate, or mixed sodium/potassium nitrate salt), the resultant glass ceramic may have high stored energy, with a maximum central tension of from about 70 MPa to about 140 MPa. Such glass articles may also exhibit high fracture toughness ($K_{1C}$ of 1.1 MPa√m measured in accordance with the standard Chevron notch test or 1.32 MPa*m$^{1/2}$ measured in accordance with the double cantilever beam (DCB) method) and be non-frangible at thicknesses of 0.8 mm, where glass would be frangible. These glass ceramics may also exhibit desirable mechanical performance characteristics.

However, the crystalline phases of these glass ceramics may also undergo ion exchange during the ion exchange treatment, for example when the lithium in lithium disilicate crystal phases exchanges with sodium in the ion exchange salt, which can form a low-index surface layer (i.e., a layer having a lower refractive index than the glass ceramic article) that is highly enriched in sodium, as shown in FIG. 1. In particular, the ion exchange between lithium disilicate and sodium ions can result in low-index silicate being added to the glass phase of the glass ceramic as well as formation of sodium silicate and sodium disilicate within the surface layer. FIG. 1 is a graph of the sodium, lithium, and potassium distribution in a glass ceramic article having Composition A in Table 1 after the glass ceramic article is ion exchanged in a mixed $KNO_3/NaNO_3$ salt containing less than 0.04 wt % $LiNO_3$.

TABLE 1

|  | Comp. A |
| --- | --- |
| $SiO_2$ | 70.65 |
| $Al_2O_3$ | 4.20 |
| $Li_2O$ | 22.10 |
| $Na_2O$ | 0 |
| $K_2O$ | 0 |
| $P_2O_5$ | 0.80 |
| $ZrO_2$ | 2.00 |
| $SnO_2$ | 0.15 |
| $B_2O_3$ | 0.00 |
| $Li_2O/R_2O$ | 1.00 |
| $R_2O/Al_2O_3$ | 5.26 |

As shown in FIG. 1, the surface layer is sodium-enriched, where sodium is ion exchanging with lithium ions and both the glass and crystalline phases.

Figure 2A:
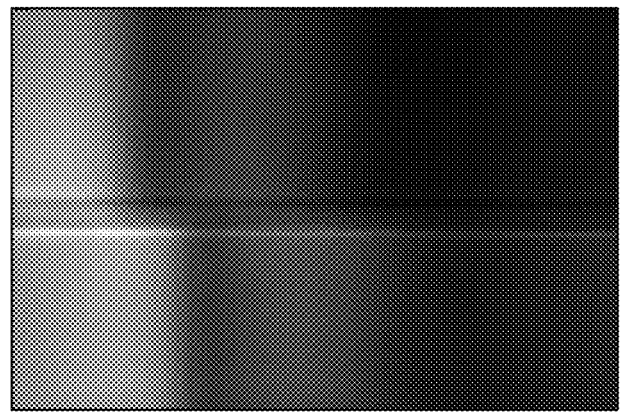
FIGS. 2A and 2B are FSM spectra at 365 nm for glass ceramic articles subjected to conventional ion exchange treatments.
Figure 2B:
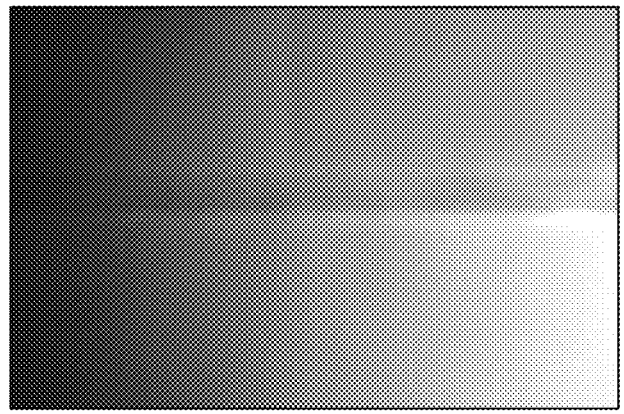

FIGS. 2A and 2B are both FSM images taken at 365 nm wavelength. As shown in FIG. 2A, because the surface layer has a lower refractive index than the glass ceramic article, FSM images of the article are blurry, which makes the use of FSM as a quality control means unreliable for monitoring ion exchange processes, especially when the thickness of the ion-exchanged layer is below about 3 µm.

In addition, the formation of a high stress layer generated by the ion exchange of sodium ions with lithium in the lithium disilicate is blocked by very low amounts of lithium poisoning in the salt bath. In other words, 0.04 wt % of $LiNO_3$ in the ion-exchange bath is sufficient to block the formation of fringes, as shown in FIG. 2B. In order to prevent the lithium poisoning, the salt in the tanks has to be changed after ion exchanging about 0.01 m$^2$ of glass ceramic per 1 kg salt.

Figure 3:
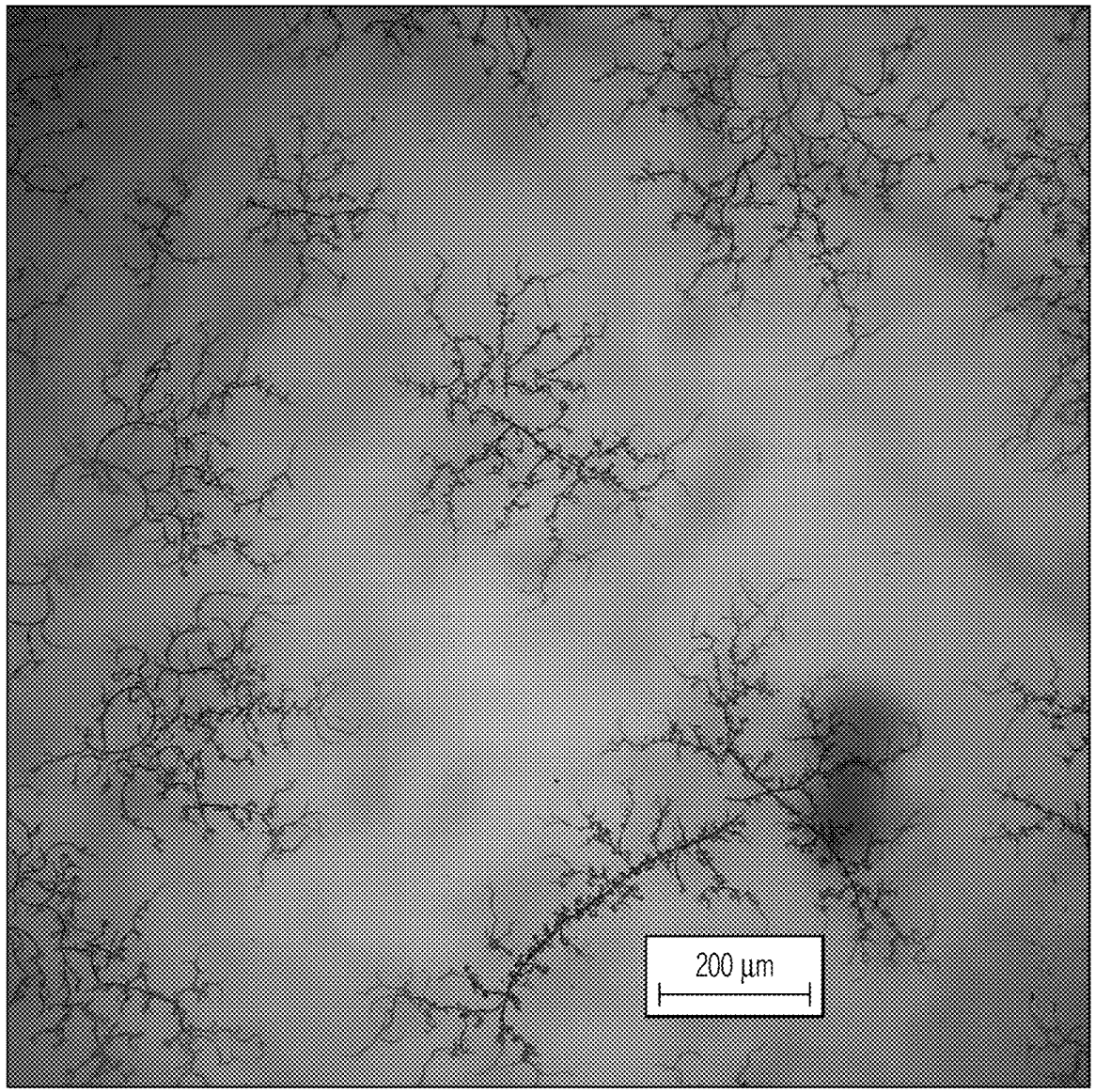
FIG. 3 is an optical micrograph of the glass ceramic article having the elemental distribution of FIG. 1 after exposure to 85° C./85% relative humidity for 48 hours.

Moreover, the sodium-enriched surface layer makes the glass ceramic surface susceptible to subsurface hydration, which can result in the growth of sodium carbonate crystals on the surface, which can, in turn, create surface haze, as shown in FIG. 3. FIG. 3 is an optical micrograph resulting from exposure of the glass article having the elemental distribution of FIG. 1 to 85% relative humidity at 85° C. for 48 hours. The dendritic growth shown in FIG. 3 are sodium carbonate crystals. More particularly, sodium carbonate crystal growth occurs where hydronium ions from water exchange for sodium ions and move into the glass subsurface layer, sodium ions come out of the glass surface, and $Na_2CO_3$ forms on the glass over time through reaction of the sodium ions with atmospheric $CO_2$. Such sodium carbonate growth could occur in the presence of atmospheric moisture on the glass over a longer period of time, for example when parts are packaged in a high humidity environment and atmospheric moisture is trapped between the glass surface and the packing film.

Figure 4A:
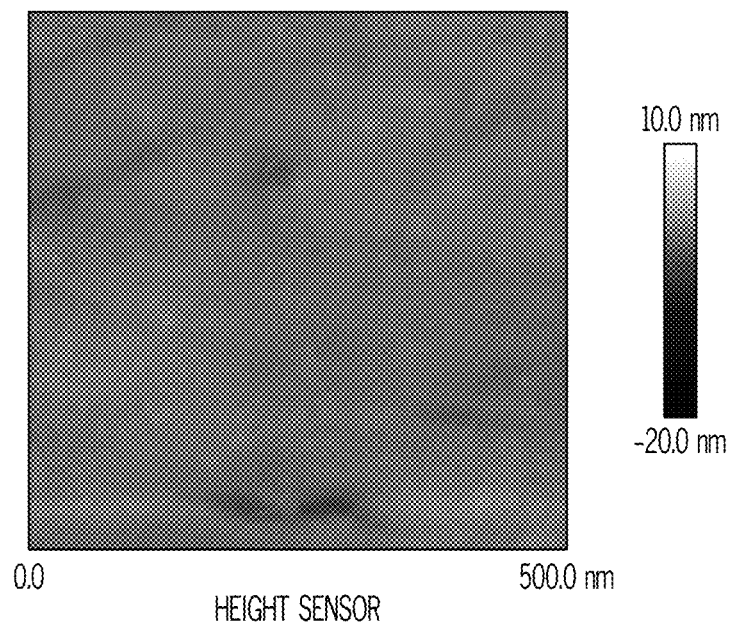
FIG. 4A is an atomic force microscope (AFM) image of the surface roughness of a glass sample consistent with Example A.
Figure 4B:
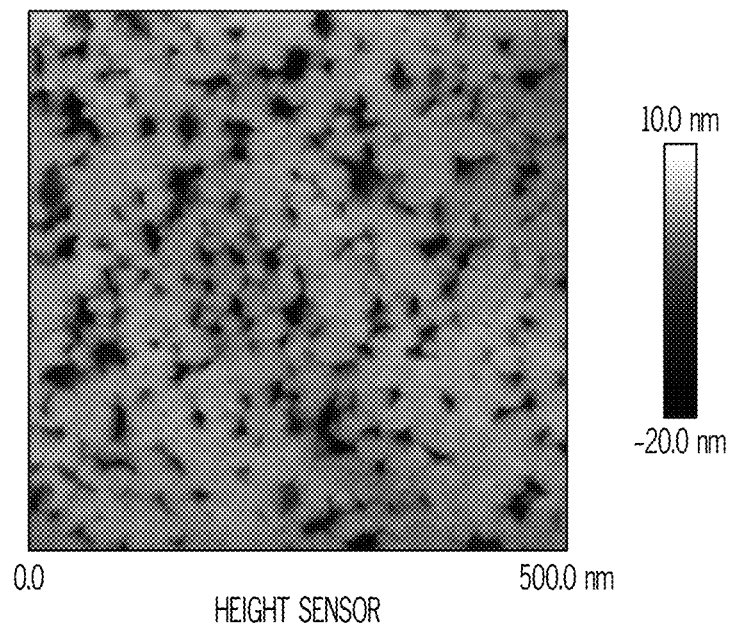
FIG. 4B is an AFM image of the surface roughness of a glass ceramic article formed from Composition A subjected to a conventional ion exchange treatment.

The generation of a sodium-enriched surface layer also makes the surface susceptible to preferential etching and pitting during polishing and washing, as shown in FIGS. 4A and 4B. In particular, FIGS. 4A and 4B are atomic force microscope (AFM) images of 500 nm×500 nm samples that were ion exchanged, polished, and washed. FIG. 4A depicts the surface roughness of a glass article formed from glass composition having nominal composition in mol % of: 71 $SiO_2$; 1.9 $B_2O_3$; 12.8 $Al_2O_3$; 2.4 $Na_2O$; 8.2 $Li_2O$; 2.9 MgO; 0.8 ZnO; 0.02 $Fe_2O_3$; 0.01 $ZrO_2$; 0.06 $SnO_2$, and ion exchanged according to a conventional ion exchange treatment as in Example A. FIG. 4B depicts the surface roughness of a glass ceramic formed from Composition A that was ion exchanged in a mixed $KNO_3/NaNO_3$ salt containing less than 0.04 wt % $LiNO_3$. As a result of the low chemical durability of the sodium-enriched surface layer, polishing and washing can result in high surface roughness, which reduces the durability of coatings can be used in cover glass applications. Such coatings may provide, by way of example and not limitation, scratch resistance, antireflection, oleophobic, or hydrophobic properties to the cover glass.

In various embodiments described herein, glass ceramics are chemically strengthened through an ion exchange treatment to improve chemical durability and damage resistance of glass ceramics while enabling metrology and preventing the formation of a haze layer under high humidity conditions. Embodiments of the ion exchange treatment will now be described in greater detail.

Single Fringe Ion Exchange Treatment

In various embodiments, the ion exchange treatments of a glass ceramic articles result in a waveguiding layer that produces one fringe per polarization state in FSM measurements, and are referred to herein as "single fringe IOX." In such embodiments, the sodium for lithium ion exchange rate is a rate that lowers the refractive index of the surface layer less than the refractive index increases due to potassium for sodium ion exchange in the surface layer, thereby allowing a waveguiding layer to be formed.

In various embodiments, a single fringe IOX treatment includes applying an ion exchange medium to one or more surfaces of the glass ceramic article. The ion exchange medium may be a molten salt bath, a solution, a paste, a gel, or another suitable medium comprising $KNO_3$, $NaNO_3$, and $LiNO_3$.

In various embodiments, the ion exchange medium comprises greater than 0 wt % $NaNO_3$ and less than or equal to about 20 wt % $NaNO_3$ based on a total amount of $NaNO_3$ and $KNO_3$ in the ion exchange medium. For example, the ion exchange media of various embodiments can comprise from >0 wt % to 20 wt %, from >0 wt % to 15 wt %, from >0 wt % to 12 wt %, from >0 wt % to 10 wt %, from >0 wt % to 7.5 wt %, from >0 wt % to 5 wt %, from 2.5 wt % to 20 wt %, from 2.5 wt % to 15 wt, from 2.5 wt % to 12 wt %, from 2.5 wt % to 10 wt %, from 2.5 wt % to 7.5 wt %, from 2.5 wt % to 5 wt %, from 5 wt % to 20 wt %, from 5 wt % to 15 wt %, from 5 wt % to 12 wt %, from 5 wt % to 10 wt %, from 5 wt % to 7.5 wt %, from 7.5 wt % to 20 wt %, from 7.5 wt % to 15 wt, from 7.5 wt % to 12 wt %, from 7.5 wt % to 10 wt %, from 10 wt % to 20 wt %, from 10 wt % to 15 wt, from 10 wt % to 12 wt % $NaNO_3$ based on a total amount of $NaNO_3$ and $KNO_3$ in the ion exchange medium, or any and all sub-ranges formed from any of these endpoints.

In various embodiments, the ion exchange medium comprises from about 80 wt % to less than 100 wt % $KNO_3$ based on a total amount of $NaNO_3$ and $KNO_3$ in the ion exchange medium. For example, the ion exchange media of various embodiments can comprise from 80 wt % to 99.9 wt %, from 80 wt % to 97.5 wt %, from 80 wt % to 95 wt %, from 80 wt % to 92.5 wt %, from 80 wt % to 90 wt %, 90 wt % to 99.9 wt %, from 90 wt % to 97.5 wt %, from 90 wt % to 95 wt %, from 90 wt % to 92.5 wt %, 92.5 wt % to 99.9 wt %, from 92.5 wt % to 97.5 wt %, from 92.5 wt % to 95 wt %, 95 wt % to 99.9 wt %, from 95 wt % to 97.5 wt %, 97.5 wt % to 99.9 wt % $KNO_3$ based on a total amount of $NaNO_3$ and $KNO_3$ in the ion exchange medium, or any and all sub-ranges formed from any of these endpoints.

According to various embodiments, the ion exchange medium further includes from 0.01 wt % to 0.5 wt % $LiNO_3$ based on a total weight of salts in the ion exchange medium. For example, the ion exchange media of various embodiments can comprise from 0.01 wt % to 0.5 wt %, from 0.01 wt % to 0.3 wt %, from 0.01 wt % to 0.1 wt %, 0.1 wt % to 0.5 wt %, from 0.1 wt % to 0.3 wt %, from 0.3 to 0.5 wt % $LiNO_3$ or any and all sub-ranges formed from any of these endpoints. In some particular embodiments, the ion exchange medium includes 0.1 wt %, 0.09 wt %, 0.08 wt %, 0.07 wt % or 0.06 wt % $LiNO_3$ based on a total weight of salts in the ion exchange medium.

The ion exchange treatment can be a single step treatment or a multiple step treatment, for example a two-step or three-step treatment. In embodiments in which the ion exchange treatment includes multiple steps, it should be understood that each step includes applying an ion exchange medium to the glass ceramic article, and that the ion exchange medium of each step may be different from the ion exchange medium of one or more other steps. However, each ion exchange medium includes greater than 0 wt % $NaNO_3$ and less than or equal to about 20 wt % $NaNO_3$ based on a total amount of $NaNO_3$ and $KNO_3$ in the ion exchange medium, from about 80 wt % to less than 100 wt % $KNO_3$ based on a total amount of $NaNO_3$ and $KNO_3$ in the ion exchange medium, and from 0.01 wt % to 0.5 wt % $LiNO_3$ based on a total weight of salts in the ion exchange medium.

In various embodiments, the temperature of the molten salt bath may be from about 380° C. to about 550° C., and an immersion time is from about 2 hours to about 16 hours.

No Fringe Ion Exchange Treatment

In various embodiments, the ion exchange treatments use a potassium concentration lower than effective to produce a surface waveguide for FSM measurements, and are referred to herein as "no fringe IOX." In such embodiments, the potassium, sodium, and lithium concentrations in the ion exchange medium are suitable to limit the average sodium oxide incorporation from the surface 100 nm into the depth of the glass ceramic article to less than 10 mol % sodium oxide as measured using glow discharge optical emission spectrometry (GDOES). Although lacking the surface waveguide, in various embodiments, the surface layer has a chemical durability that makes it particularly well-suited for cover glass applications.

In various embodiments, a no fringe IOX treatment includes applying an ion exchange medium to one or more surfaces of the glass ceramic article. The ion exchange medium may be a solution, a paste, a gel, or another suitable medium comprising $KNO_3$, $NaNO_3$, and $LiNO_3$.

In various embodiments, the ion exchange medium comprises greater than 20 wt % $NaNO_3$ and less than or equal to about 50 wt % $NaNO_3$ based on a total amount of $NaNO_3$ and $KNO_3$ in the ion exchange medium. For example, the ion exchange media of various embodiments can comprise from 20 wt % to 50 wt %, from 20 wt % to 45 wt %, from 20 wt % to 40 wt %, from 20 wt % to 35 wt %, from 20 wt % to 30 wt %, from 30 wt % to 50 wt %, from 30 wt % to 45 wt %, from 30 wt % to 40 wt %, from 30 wt % to 35 wt %, from 35 wt % to 50 wt %, from 35 wt % to 45 wt %, from 35 wt % to 40 wt %, from 40 wt % to 50 wt %, from 40 wt % to 45 wt %, from 45 wt % to 50 wt % $NaNO_3$ based on a total amount of $NaNO_3$ and $KNO_3$ in the ion exchange medium, or any and all sub-ranges formed from any of these endpoints. It should be appreciated, however, that in some embodiments, $NaNO_3$ may be incorporated in amounts of greater than 50 wt %, although in that case amounts of greater than about 0.15 wt % $LiNO_3$ may be beneficial depending on the particular amount of $NaNO_3$ and temperature of the ion exchange treatment.

In various embodiments, the ion exchange medium comprises from about 50 wt % to about 80 wt % $KNO_3$ based on a total amount of $NaNO_3$ and $KNO_3$ in the ion exchange medium. For example, the ion exchange media of various embodiments can comprise from 50 wt % to 80 wt %, from 50 wt % to 70 wt %, from 50 wt % to 65 wt %, from 50 wt % to 60 wt %, from 50 wt % to 55 wt %, from 55 wt % to 80 wt %, from 55 wt % to 70 wt %, from 55 wt % to 65 wt %, from 55 wt % to 60 wt %, from 60 wt % to 80 wt %, from 60 wt % to 70 wt %, from 60 wt % to 65 wt %, from 65 wt % to 80 wt %, from 65 wt % to 70 wt %, from 70 wt % to 80 wt % $KNO_3$ based on a total amount of $NaNO_3$ and $KNO_3$ in the ion exchange medium, or any and all sub-ranges formed from any of these endpoints.

According to various embodiments, the ion exchange medium further includes from 0.04 wt % to 0.5 wt % $LiNO_3$ based on a total weight of salts in the ion exchange medium. For example, the ion exchange media of various embodiments can comprise from 0.04 wt % to 0.5 wt %, from 0.04 wt % to 0.3 wt %, from 0.04 wt % to 0.1 wt %, 0.1 wt % to 0.5 wt %, from 0.1 wt % to 0.3 wt %, from 0.3 to 0.5 wt % LiNO$_3$ based on a total weight of salts in the ion exchange medium, or any and all sub-ranges formed from any of these endpoints. In some particular embodiments, the ion exchange medium includes 0.1 wt %, 0.09 wt %, 0.08 wt %, 0.07 wt % or 0.06 wt % LiNO$_3$ based on a total weight of salts in the ion exchange medium.

The ion exchange treatment can be a single step treatment or a multiple step treatment, for example a two-step or three-step treatment. In embodiments in which the ion exchange treatment includes multiple steps, it should be understood that each step includes applying an ion exchange medium to the glass ceramic article, and that the ion exchange medium of each step may be different from the ion exchange medium of one or more other steps. However, each ion exchange medium includes greater than 20 wt % NaNO$_3$ and less than or equal to about 50 wt % NaNO$_3$ based on a total amount of NaNO$_3$ and KNO$_3$ in the ion exchange medium, from about 50 wt % to about 80 wt % KNO$_3$ based on a total amount of NaNO$_3$ and KNO$_3$ in the ion exchange medium, and from 0.04 wt % to 0.5 wt % LiNO$_3$ based on a total weight of salts in the ion exchange medium.

In various embodiments, the temperature of the molten salt bath may be from about 380° C. to about 550° C., and an immersion time is from about 2 hours to about 16 hours.

Figure 5:
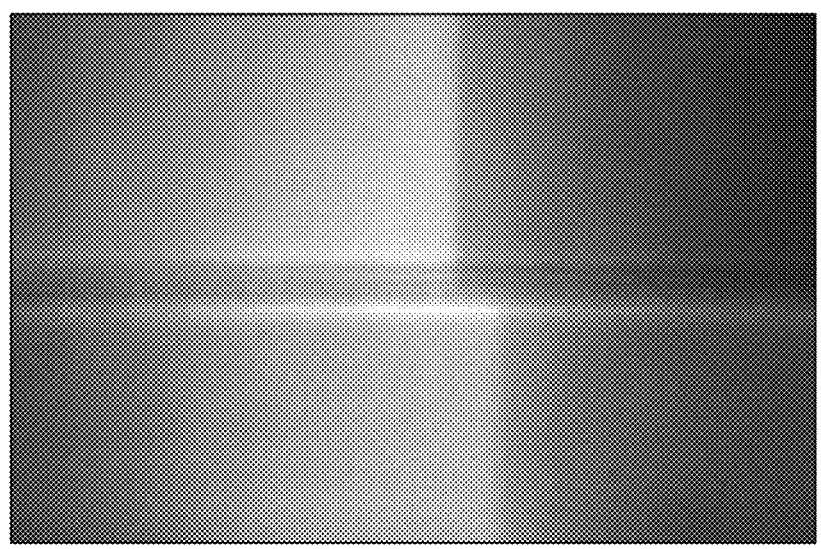
FIG. 5 is an FSM spectrum at 365 nm of a glass ceramic article subjected to a no fringe ion exchange treatment according to one or more embodiments shown and described herein.

Without being bound by theory, it is believed that in glass ceramics from the lithium disilicate and/or petalite family, when the concentration of NaNO$_3$ in the ion exchange treatment exceeds about 20 wt %, the increase in the refractive index attributed to the potassium ion exchange is overpowered by the decrease in the refractive index attributed to the exchange of sodium for lithium ions. Accordingly, potassium fringes that are conventionally suitable for FSM metrology are not generated during the no fringe ion exchange treatment. For example, as shown in FIG. 5, a 365 nm FSM spectrum of the glass of Composition A ion exchanged in 60 wt % KNO$_3$ and 40 wt % NaNO$_3$, with 0.1 wt % LiNO$_3$ is provided. By comparing FIG. 5 to FIG. 2A, it can be seen that the blurry low index fringes that appear in FIG. 2A that are indicative of sodium ion exchange with lithium in crystal phase do not appear in FIG. 5. Accordingly, FSM metrology may be unsuitable for use in processes for monitoring the sodium ion exchange of the no fringe IOX treatment.

Figure 6:
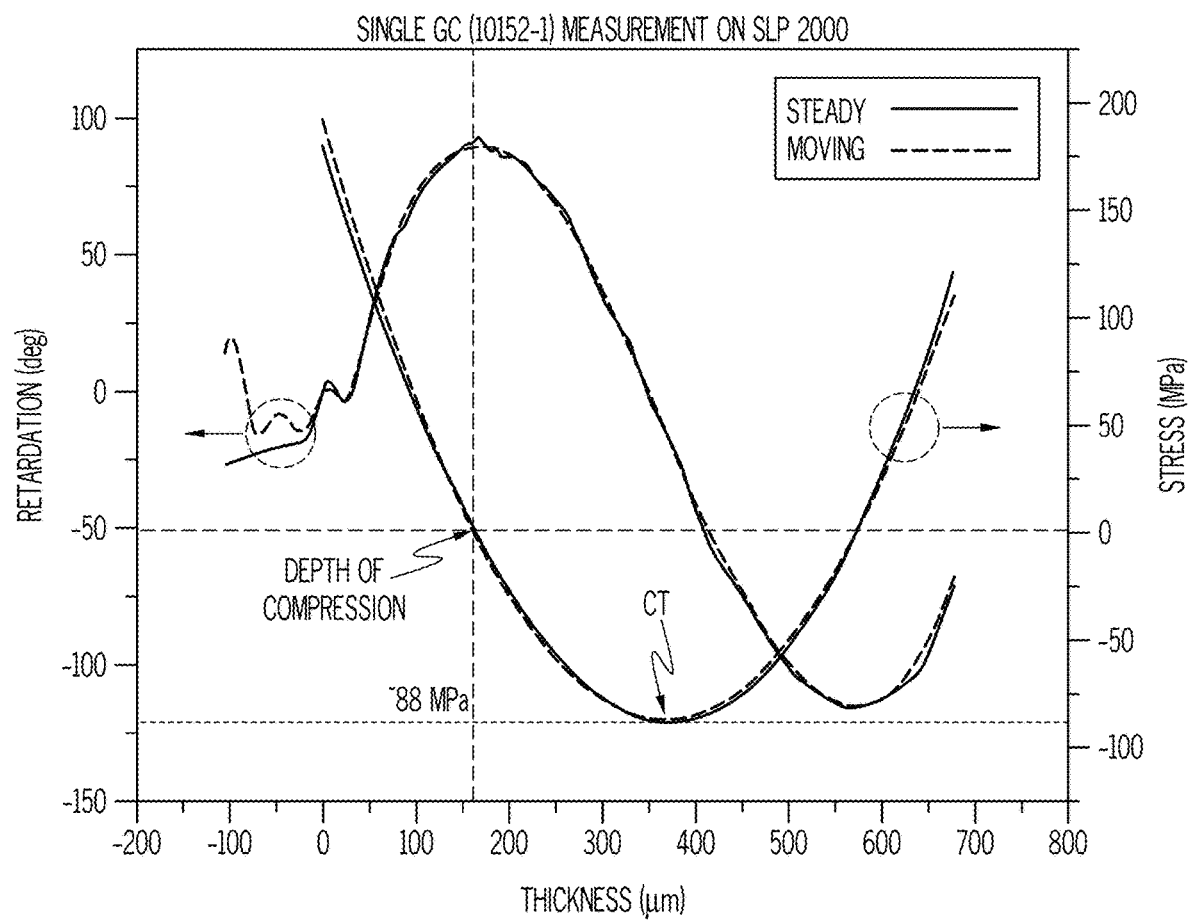
FIG. 6 is a plot of the retardation (left Y-axis; in degrees) and stress (right Y-axis; in Mega Pascals (MPa), where compressive stress is positive and tensile stress is negative) as a function of thickness into the thickness of the sample from the surface (X-axis; in micrometers or μm) for a glass ceramic article subjected to a no fringe ion exchange treatment according to one or more embodiments shown and described herein.

However, the FSM spectrum can be used to obtain the surface compressive stress from the birefringence. For example, an Orihara SLP 2000 scattered light photoelastic stress meter operating at 405 nm was used to obtain a depth of compression and central tension, and the results are shown in FIG. 6. The 405 nm wavelength may be particularly advantageous for transparent glass ceramics because it is believed that the 405 nm wavelength minimizes the speckle. However, a higher wavelength (e.g., 633 nm) can be used, although it may significantly increase speckle. In some such embodiments, speckle may be averaged out by moving the specimen during measurement.

The Orihara SLP 2000 includes a built-in 2× magnification telecentric lens, which enables a camera field of view of up to 600 μm in the depth direction. However, due to the high refractive index nature of glass ceramics, the depth perception can be extended to approximately 800 μm, allowing the SLP 2000 to be used to obtain a full stress profile measurement of various glass ceramic articles described herein.

In operation, a laser diode at 405 nm is periodically phase modulated through a liquid crystal variable retarder before entering the glass ceramic. Due to the stress distribution in the glass ceramic, the scattered light experiences a change in intensity and phase as it travels through the thickness of the glass ceramic. While light scatters in all directions, a camera set at 45° with respect to the surface of the glass ceramic captures the vertical component of the intensity fluctuations along the laser path. The phase shift experienced at each point along the laser path is captures via image analysis and an internal stress σ can be deduced according to the following equation (2):

$$\sigma = \left(\frac{1}{\beta}\right)\left(\frac{\lambda}{360}\right)\left(\frac{d\varphi}{dx}\right) \tag{2}$$

where λ is the wavelength of the laser, β is the stress optical coefficient (SOC), φ is the phase shift, and x is the optical path length.

The SLP 2000 software provide a live display of the laser beam inside the sample. In various embodiments, a 6$^{th}$ order polynomial fit may be used to provide consistent results across various glass ceramic samples. However, processing area, laser wavelength, and the appropriate fitting function may vary depending on the particular embodiment.

Alternatively, a quality control metrology can be derived from integration of the compressive stress. In particular, integration of the compressive stress from ion exchange correlates to a number of ions that have ion exchanged. As the larger ions replace smaller ions, the glass article undergoes dimensional growth, which correlates with central tension, as long as the ion exchange process is performed below the peak central tension. Once the peak central tension is reached, although there is still growth in ion exchange, the correlation between dimensional growth and central tension is no longer valid. An example of the % dimensional growth correlation with central tension from three different salt concentrations is shown in FIG. 7.

Figure 7:
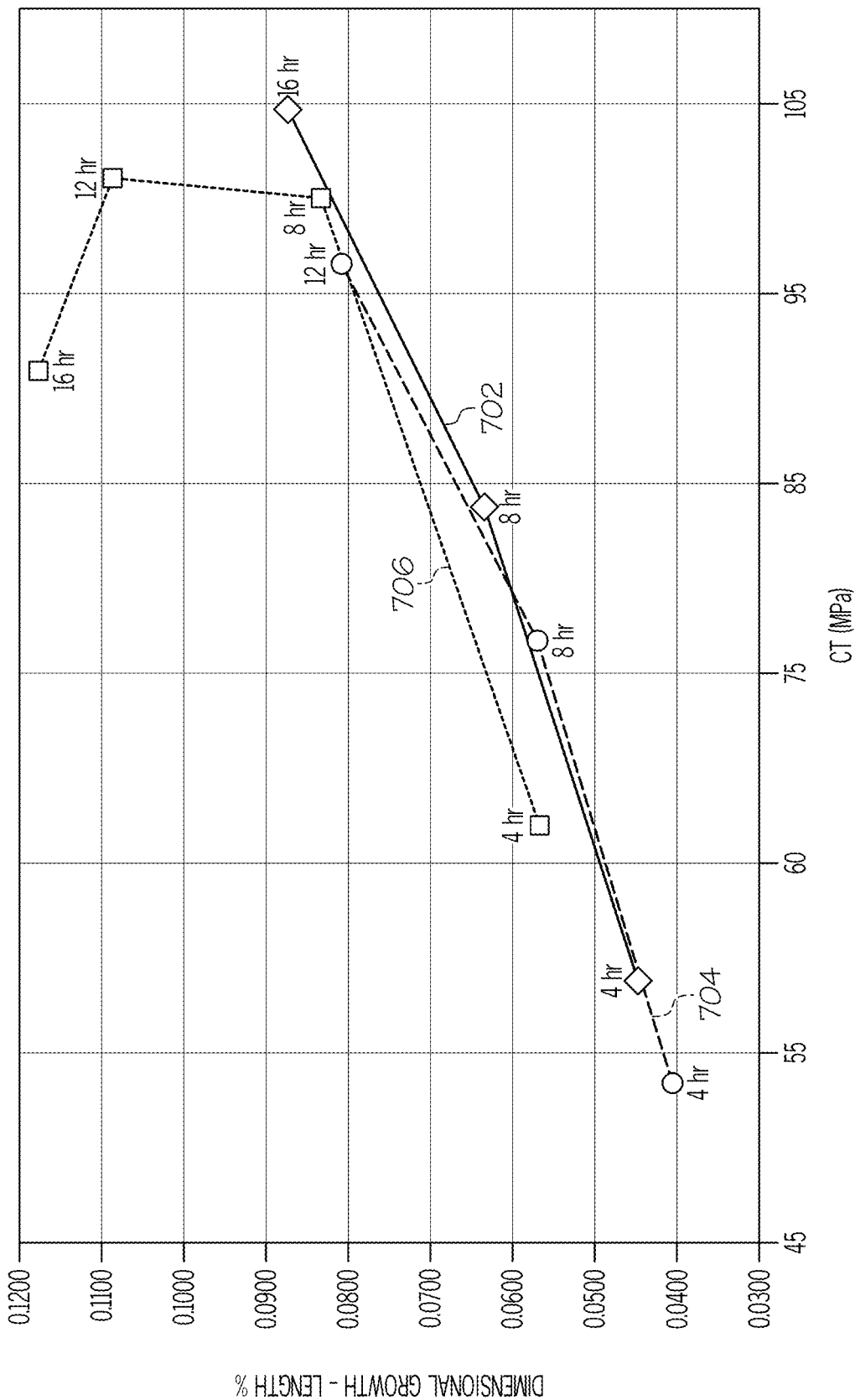
FIG. 7 is a plot of the dimensional growth from ion-exchange (Y-axis; in % of length) correlated with the central tension (X-axis; in MPa) for glass ceramic articles subjected to a no fringe ion exchange treatment according to one or more embodiments shown and described herein.

In FIG. 7, the central tension in MPa is shown along the X-axis while the dimensional growth in % of the length is shown along the Y-axis. Each of the glass ceramic samples was made from Composition A. Plot 702 shows the correlation for a glass ceramic sample ion exchanged in a bath of 50 wt % KNO$_3$ and 50 wt % NaNO$_3$ with 0.1 wt % LiNO$_3$ at 470° C. Plot 704 shows the correlation for a glass ceramic sample ion exchanged in a bath of 70 wt % KNO$_3$ and 30 wt % NaNO$_3$ with 0.1 wt % LiNO$_3$ at 470° C. Plot 706 shows the correlation for a glass ceramic sample ion exchanged in a bath of 60 wt % KNO$_3$ and 40 wt % NaNO$_3$ with 0.1 wt % LiNO$_3$ at 500° C. As shown in FIG. 7, the % dimensional growth from ion exchange can be used as a method for measuring compressive stress below the peak compressive stress value. In particular, plot 706 sows that after 8 hours, the central tension reaches approximately 95 MPa, and increased ion exchange shows an increase in dimensional growth that does not correlate with the compressive stress. In particular, for transparent glass and glass ceramic materials, dimensional growth can be correlated to the central tension according to the following equation (3):

$$CT = 1182 * DG + 20 \tag{3}$$

where CT is the central tension in MPa and DG is the % length of dimensional growth when the central tension is below the peak central tension.

For opaque materials, the % dimensional growth can be calibrated with the elemental profile obtained by microprobe and converted to stress using a lattice dilation constant according to the following equation (4):

$$\sigma(z) = \frac{BE}{1-v}(C_{avg} - C(z)) = \frac{BE}{1-v}\left(\frac{1}{h}\int_0^h C(z)dz - C(z)\right) \quad (4)$$

where C(z) is the concentration of large cations at z, h is the glass thickness, B is the network dilation coefficient, E is the Young's modulus, v is the Poisson's ratio, and z is the distance from the glass surface across the glass thickness which values 0 and h at the surfaces.

Ion-Exchanged Glass Ceramic Articles

In various embodiments, the resulting ion-exchanged glass ceramic articles that may be transparent or opaque, and have a depth of compression (DOC) that is from about 0.18t to about 0.25t from the outer surface of the ion-exchanged glass ceramic article, where t is the thickness of the ion-exchanged glass ceramic article. In other words, the stress in the ion-exchanged glass ceramic article transitions from a compressive stress to a tensile stress at a depth of from about 0.18t to about 0.25t from the outer surface of the ion-exchanged glass ceramic article. The DOC, in various embodiments, can be greater than 80 μm. For example, the depth of compression can be from 80 μm to 300 μm, from 100 μm to 250 μm, from 150 μm to 200 μm, or any and all sub-ranges formed from any of these endpoints. The deep DOC can provide damage resistance, for example may provide resistance to sharp flaws that can result from dropping the glass ceramic article on a rough surface for example asphalt.

In various embodiments described herein, the resulting ion-exchanged glass ceramic article has a maximum compressive stress (absolute value) at the outer surface of 1.8 to 2.2 times the maximum central tension (absolute value) (CT) of the ion-exchanged glass ceramic article. For example, the absolute value of the maximum compressive stress may be, for example, 2|CT|. In embodiments, the absolute value of the maximum central tension is at least 60 MPa or more or 70 MPa or more. For example, the absolute value of the maximum central tension may be from 60 MPa to 160 MPa, from 60 MPa to 150 MPa, from 60 MPa to 140 MPa, from 60 MPa to 130 MPa, from 60 MPa to 120 MPa, from 60 MPa to 110 MPa, from 60 MPa to 100 MPa, from 70 MPa to 160 MPa, from 70 MPa to 150 MPa, from 70 MPa to 140 MPa, from 70 MPa to 130 MPa, from 70 MPa to 120 MPa, from 70 MPa to 110 MPa, from 70 MPa to 100 MPa, from 80 MPa to 160 MPa, from 80 MPa to 150 MPa, from 80 MPa to 140 MPa, from 80 MPa to 130 MPa, from 80 MPa to 120 MPa, from 80 MPa to 110 MPa, from 80 MPa to 100 MPa, from 90 MPa to 160 MPa, from 90 MPa to 150 MPa, from 90 MPa to 140 MPa, from 90 MPa to 130 MPa, from 90 MPa to 120 MPa, from 90 MPa to 110 MPa, from 90 MPa to 100 MPa, from 100 MPa to 160 MPa, from 100 MPa to 150 MPa, from 100 MPa to 140 MPa, from 100 MPa to 130 MPa, from 100 MPa to 120 MPa, from 100 MPa to 110 MPa, or any and all sub-ranges formed from any of these endpoints.

The ion-exchanged glass ceramic articles further have a maximum compressive stress of from 108 MPa to 350 MPa in various embodiments. For example, the absolute value of the maximum compressive stress can be from 108 MPa to 350 MPa, from 108 MPa to 325 MPa, from 108 MPa to 300 MPa, from 108 MPa to 275 MPa, from 108 MPa to 250 MPa, from 108 MPa to 225 MPa, from 108 MPa to 200 MPa, from 180 MPa to 350 MPa, from 180 MPa to 325 MPa, from 180 MPa to 300 MPa, from 180 MPa to 275 MPa, from 180 MPa to 250 MPa, from 180 MPa to 225 MPa, from 180 MPa to 200 MPa, from 200 MPa to 350 MPa, from 200 MPa to 325 MPa, from 200 MPa to 300 MPa, from 200 MPa to 275 MPa, from 200 MPa to 250 MPa, from 200 MPa to 225 MPa, from 225 MPa to 350 MPa, from 225 MPa to 325 MPa, from 225 MPa to 300 MPa, from 225 MPa to 275 MPa, from 225 MPa to 250 MPa, from 250 MPa to 350 MPa, from 250 MPa to 325 MPa, from 250 MPa to 300 MPa, from 250 MPa to 275 MPa, from 275 MPa to 350 MPa, from 275 MPa to 325 MPa, from 275 MPa to 300 MPa, from 300 MPa to 350 MPa, from 300 MPa to 325 MPa, from 325 MPa to 350 MPa, or any and all sub-ranges formed from any of these endpoints.

Fracture toughness can also be used to characterize the ion-exchanged glass ceramic articles. In various embodiments, the ion-exchanged glass ceramic articles have a fracture toughness of 1 MPa√m or more as measured according to the double cantilever beam method on a sample of the same composition but prior to ion-exchange. For example, in various embodiments, the ion-exchanged glass ceramic articles have a fracture toughness of from 1 MPa√m to 1.5 MPa√m as measured according to the double cantilever beam method.

Various embodiments described herein can also be used to reduce the frangibility of a glass ceramic article. Accordingly, in various embodiments, the glass ceramic articles are not frangible upon being ion-exchanged. Frangible behavior refers to specific fracture behavior when a glass ceramic article is subjected to an impact or insult. As utilized herein, a glass is considered non-frangible when it exhibits one or more of the following in a test area as the result of a frangibility test: (1) four or less fragments with a largest dimension of 1 mm or more, and/or (2) the number of bifurcations is less than or equal to the number of crack branches. The fragments, bifurcations, and crack branches are counted based on any 2 inch by 2 inch square centered on the impact point. Thus, a glass is considered non-frangible if it meets one or both of tests (1) and (2) for any 2 inch by 2 inch square centered on the impact point where the breakage is created according to the procedure described below. In a frangibility test, an impact probe is brought in to contact with the glass, with the depth to which the impact probe extends into the glass increasing in successive contact iterations. The step-wise increase in depth of the impact probe allows the flaw produced by the impact probe to reach the tension region while preventing the application of excessive external force that would prevent the accurate determination of the frangible behavior of the glass. In some embodiments, the depth of the impact probe in the glass may increase by about 5 μm in each iteration, with the impact probe being removed from contact with the glass between each iteration. The test area is any 2 inch by 2 inch square centered at the impact point. As utilized herein, a crack branch originates at the impact point, and a fragment is considered to be within the test area if any part of the fragment extends into the test area. While coatings, adhesive layers, and the like may be used in conjunction with the strengthened glass articles described herein, such external restraints are not used in determining the frangibility or frangible behavior of the glass ceramic articles. In some embodiments, a film that does not affect the fracture behavior of the glass ceramic article may be applied to the glass ceramic article prior to the frangibility test to prevent the ejection of fragments from the glass article, increasing safety for the person performing the test.

By way of contrast, a frangible glass article does not exhibit either four or less fragments or the number of bifurcations being less than or equal to the number of crack branches. In the frangibility test described herein, the impact is delivered to the surface of the glass article with a force that is just sufficient to release the internally stored energy present within the strengthened glass article. That is, the point impact force is sufficient to create one or more new cracks at the surface of the strengthened glass sheet and extend the crack through the compression region (i.e., to the depth of compression) into the tension region (i.e., the region that is under central tension).

Accordingly, the chemically strengthened glass ceramic articles described herein are "non-frangible"—i.e., they do not exhibit frangible behavior as described hereinabove when subjected to impact by a sharp object.

EXAMPLES

In order that various embodiments be more readily understood, reference is made to the following examples, which are intended to illustrate various embodiments. Unless noted otherwise, each of the samples in each of the examples had a thickness of 0.8 mm.

Example 1

Glass ceramic samples formed from Composition A were subjected to different ion exchange treatments and an FSM spectrum of each sample was obtained using 365 nm Orihara FSM. The results are shown in FIGS. 8A-8E.

Figure 8A:
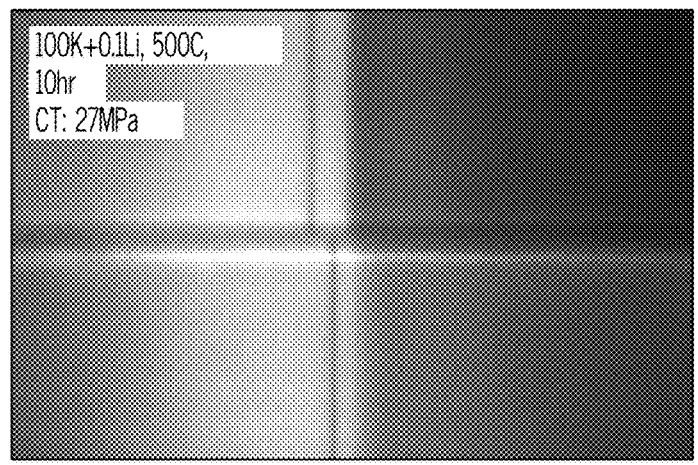
FIGS. 8A-8E are FSM spectra at 365 nm of glass ceramic articles subjected to single fringe ion exchange treatments according to one or more embodiments shown and described herein.
Figure 8B:
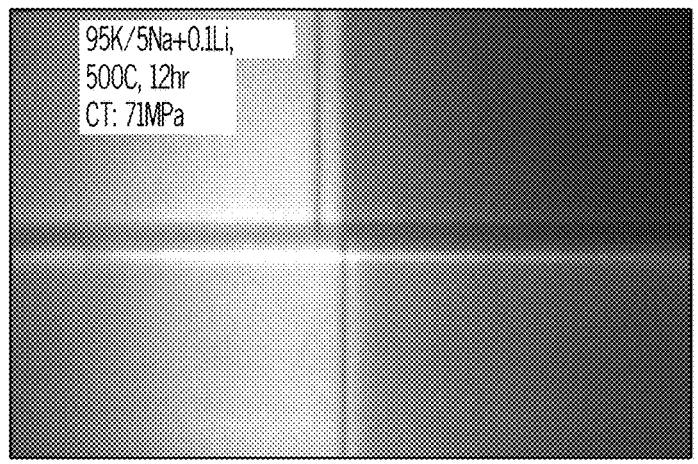
Figure 8C:
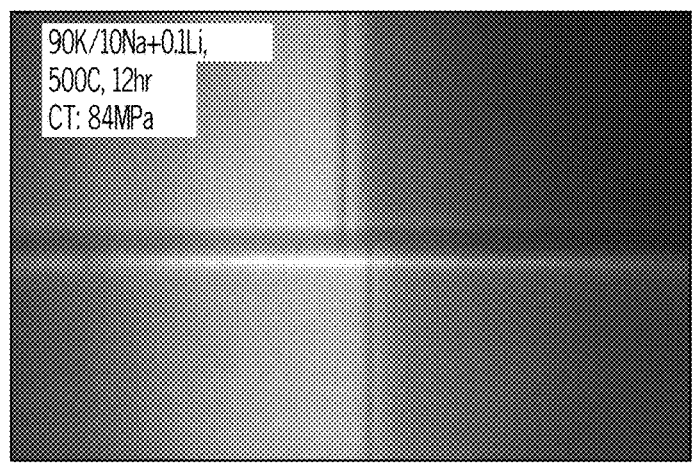

In FIG. 8A, the glass ceramic sample was subjected to an ion exchange treatment in a bath of 100 wt % $KNO_3$ and 0.1 wt % $LiNO_3$ at 500° C. for 10 hours. In FIG. 8B, the glass ceramic sample was subjected to an ion exchange treatment in a bath of 95 wt % $KNO_3$, 5 wt % $NaNO_3$, and 0.1 wt % $LiNO_3$ at 500° C. for 12 hours. In FIG. 8C, the glass ceramic sample was subjected to an ion exchange treatment in a bath of 90 wt % $KNO_3$, 10 wt % $NaNO_3$, and 0.1 wt % $LiNO_3$ at 500° C. for 12 hours. As shown in FIGS. 8A-8C, TE and TM fringes suitable for use in ion exchange quality control metrology are produced.

Figure 8D:
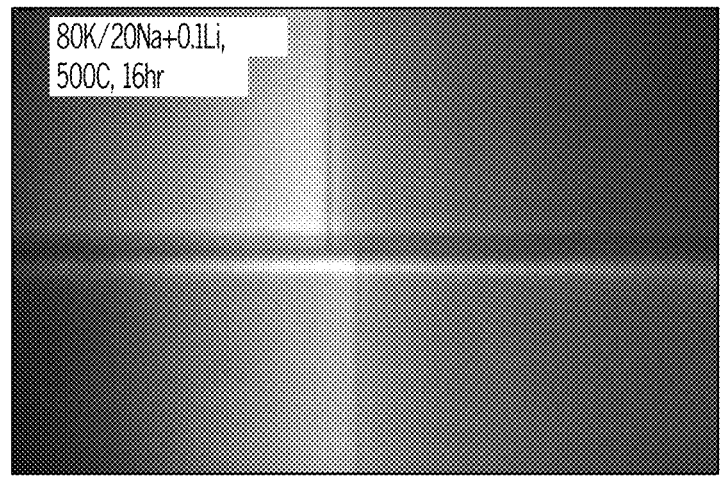
Figure 8E:
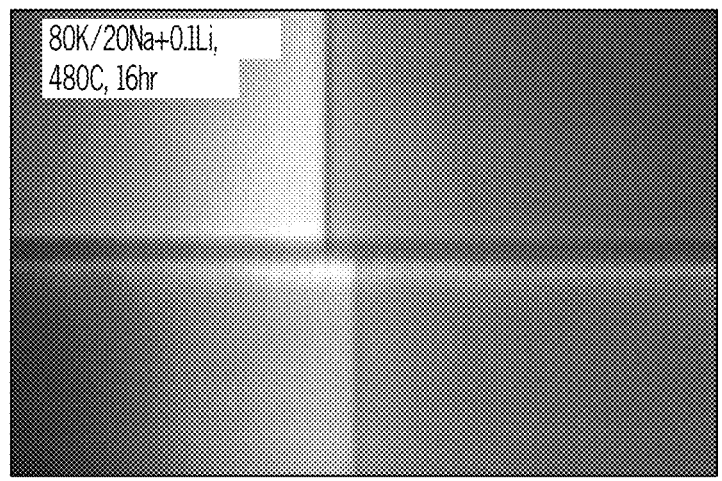

In FIG. 8D, the glass ceramic sample was subjected to an ion exchange treatment in a bath of 80 wt % $KNO_3$, 20 wt % $NaNO_3$, and 0.1 wt % $LiNO_3$ at 500° C. for 16 hours. In FIG. 8E, the glass ceramic sample was subjected to an ion exchange treatment in a bath of 80 wt % $KNO_3$, 20 wt % $NaNO_3$, and 0.1 wt % $LiNO_3$ at 480° C. for 16 hours. Although the fringes in FIGS. 8D and 8E may be suitable for metrology with advanced image processing methods, the contrast of the fringes or the critical angle transition is decreased due to the increased sodium ion exchange, which lowers the refractive index. Without being bound by theory, as seen in FIGS. 8D and 8E, the potassium fringes start to bleach out when the sodium concentration is above about 10 wt % $NaNO_3$, because the sodium to lithium ion exchange proceeds at a fast rate and lowers the refractive index of the surface layer faster than the potassium for sodium ion exchange can increase the refractive index. The sample in FIG. 8D also underwent longer treatment time (16 hours) to obtain a spectrum comparable to that shown in FIG. 8C for a processing time of 12 hours.

The compressive stress and maximum central tension were also measured for each of samples used for FIGS. 8A-8C, and the maximum central tension values are indicated on the corresponding one of FIGS. 8A-8C. As shown in FIG. 8A, the maximum central tension for the glass ceramic article treated with a pure $KNO_3/LiNO_3$ salt bath is low (27 MPa) as compared to the glass ceramic articles treated with $KNO_3/NaNO_3/LiNO_3$ (71 MPa and 84 MPa for FIGS. 8B and 8C, respectively). However, the extended treatment time of the samples including 20 wt % $NaNO_3$ (FIGS. 8D and 8E) results in a deep sodium profile that extends past the peak central tension, and resulting in lower compressive stress values.

Example 2

Prior to ion exchange strengthening, the concentration of various constituent components of the glass network (e.g., glass formers for example $SiO_2$ and $B_2O_3$, intermediates for example $Al_2O_3$, and modifiers for example CaO, $Na_2O$, etc.) of the glass ceramic article are generally uniformly distributed from the outer surfaces of the glass ceramic article through the thickness of the glass ceramic article. For example, the glass ceramic article comprises one or more glass formers and a concentration of the glass former is substantially constant through the entire thickness of the glass ceramic article. In addition, the glass ceramic article comprises one or more modifiers, for example $Na_2O$ and/or another alkali oxide, and a concentration of the modifier is substantially constant through the entire thickness of the glass ceramic article.

Figure 9:
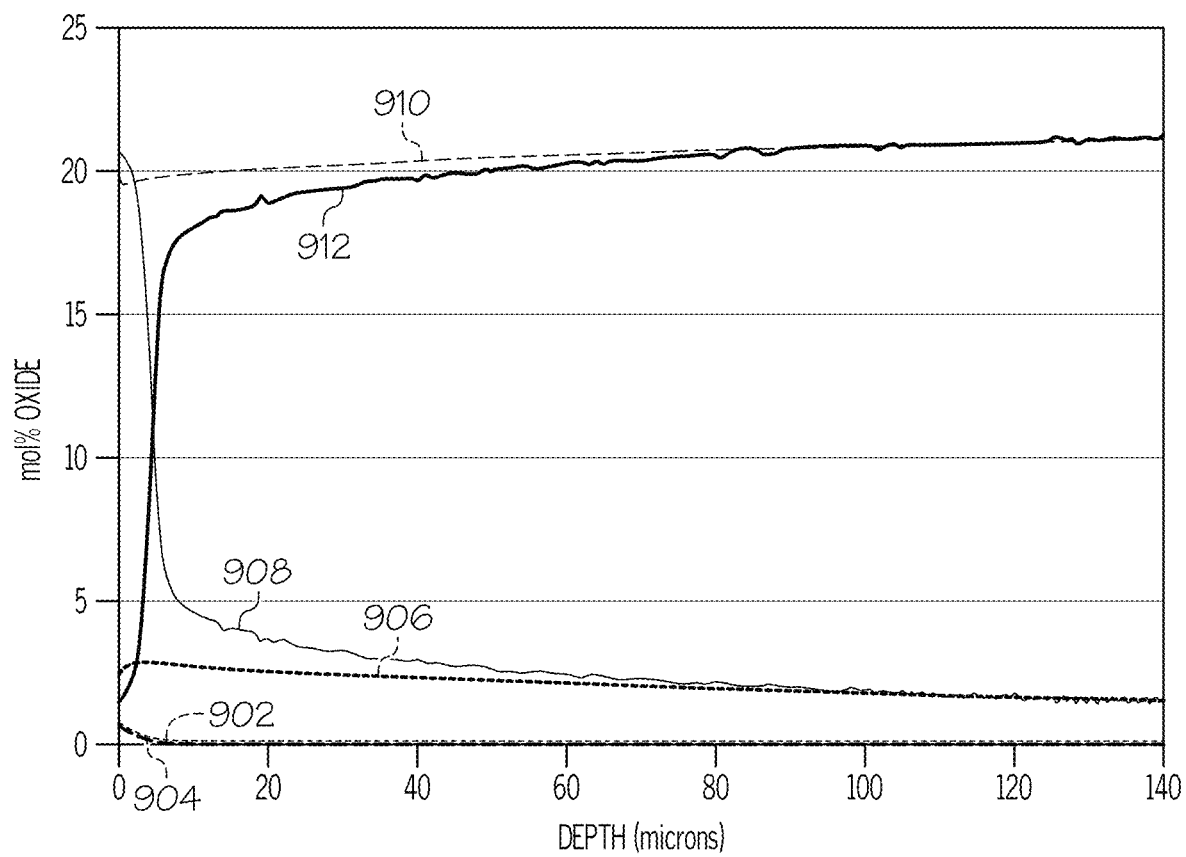
FIG. 9 is a plot of concentration (Y-axis, in mol % of the oxide) as a function of depth into the thickness of the sample from the surface (X-axis; in micrometers or μm) of sodium, lithium, and potassium elemental distribution in a glass ceramic substrate formed from Composition A when the glass ceramic substrate is subjected to a single fringe ion exchange treatment according to one or more embodiments shown and described herein.

However, after ion exchange, the concentration of the alkali oxides, for example $K_2O$, varies in the glass ceramic article as a function of depth from the outer surfaces of the glass ceramic article. To determine the effect of a single fringe ion exchange treatment on a glass ceramic article, a glass ceramic article formed from Composition A, and having a thickness of 0.8 mm, was treated with single fringe ion exchange treatment in a bath including 80 wt % $KNO_3$, 20 wt % $NaNO_3$, and 0.1 wt % $LiNO_3$ at 500° C. for 16 hours (single fringe example). Another glass ceramic article formed from Composition A, and having a thickness of 0.8 mm, was treated with a conventional ion exchange treatment in a bath including 30 wt % $KNO_3$, 70 wt % $NaNO_3$, and 0.05 wt % $LiNO_3$ at 470° C. for 12 hours followed by treatment in a bath including 30 wt % $KNO_3$ and 70 wt % $NaNO_3$ at 470° C. for 1 hour (conventional IOX example). Concentration profiles of various constituent components in the glass, for example alkali constituent components, were measured by electron probe microanalysis (EPMA), and the profiles are shown in FIG. 9.

Specifically, a concentration of $K_2O$ decreases from the surface of the glass ceramic article in the direction of a centerline CL of the glass ceramic article to a concentration of 0 mol % for both the single fringe (902) and conventional IOX treatments (904).

The concentration of $Na_2O$ (906) increases and then decreases from the surface of the glass ceramic article in the direction of a centerline CL of the glass ceramic article subjected to single fringe IOX. That is, a concentration of $Na_2O$ 904 in the glass ceramic article as a function of distance from the surfaces initially has a positive slope but then has a negative slope. In various embodiments, a difference between the surface $Na_2O$ concentration and the minimum $Na_2O$ concentration is less than 5 mol %, and the surface $Na_2O$ concentration is less than 10 mol %. In various embodiments, the concentration of $Na_2O$ is greater than 0 mol % throughout the thickness of the ion-exchanged glass ceramic article. For example, the concentration of $Na_2O$ in various embodiments is greater than 0 mol % and less than 2.5 mol %.

In contrast, the concentration of $Na_2O$ (908) for the glass ceramic article subjected to a conventional IOX treatment has a surface spike, which drops off and decreases from the surface of the glass ceramic article in the direction of a centerline CL of the glass ceramic article. Accordingly, as can be seen by comparing 906 and 908, the single fringe IOX treatment significantly decreases the amount of sodium near the surface (about 2.5 mol % versus about 20 mol %), while the deep sodium profile (which helps with damage resistance) is comparable to that of the conventional IOX treatment beyond about 80 μm, indicating a deep depth of compression.

Moreover, in FIG. 9, the $Li_2O$ concentration (910) of the glass ceramic article subjected to single fringe IOX increases with increasing distance from the surface of the glass ceramic article to a centerline CL of the glass ceramic article from a surface $Li_2O$ concentration to a maximum $Li_2O$ concentration at the centerline CL. In various embodiments, a difference between the surface $Li_2O$ concentration and the maximum $Li_2O$ concentration is less than 5 mol %. In various embodiments, the maximum concentration of $Li_2O$ is from 19 mol % to 32 mol %. In contrast, the $Li_2O$ concentration (912) of the glass ceramic article subjected to conventional IOX increases sharply near the surface, then continues increasing with increasing distance from the surface of the glass ceramic article to a centerline CL of the glass ceramic article from a surface $Li_2O$ concentration to a maximum $Li_2O$ concentration at the centerline CL. However, the difference between the surface $Li_2O$ concentration and the maximum $Li_2O$ concentration is greater than 10 mol %, greater than 15 mol %, or even greater than 18 mol %.

While the concentration of alkali oxides in the glass ceramic article changes as a result of ion exchange strengthening, it should be understood that the concentrations of the other constituents of the glass network (for example, glass formers, intermediates, and non-mobile modifiers for example alkaline earth oxides (CaO, MgO, etc.)) remain substantially the same (for example, substantially uniform through the thicknesses of the glass ceramic article.

Example 3

In order to further increase the central tension in glass ceramic articles treated with a single fringe IOX, two-step ion exchange processes were explored. The articles in Example 3 were all formed from Composition A. FSM spectra of glass ceramic articles subjected to single fringe IOX treatments are shown in FIGS. 10A-10H. In particular, each of FIGS. 10A-10H shows an FSM spectrum at 365 nm for a glass ceramic article formed from Composition A and subjected to an ion exchange treatment.

Figure 10A:
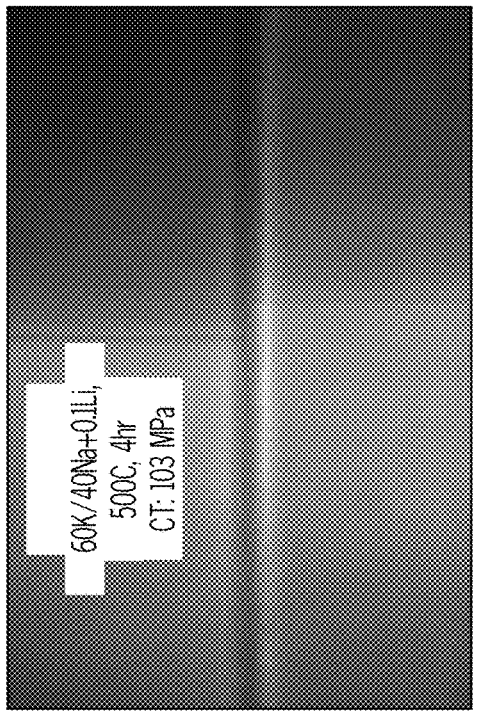
FIGS. 10A-10H are FSM spectra at 365 nm of glass ceramic articles subjected to single fringe ion exchange treatments according to one or more embodiments shown and described herein.
Figure 10B:
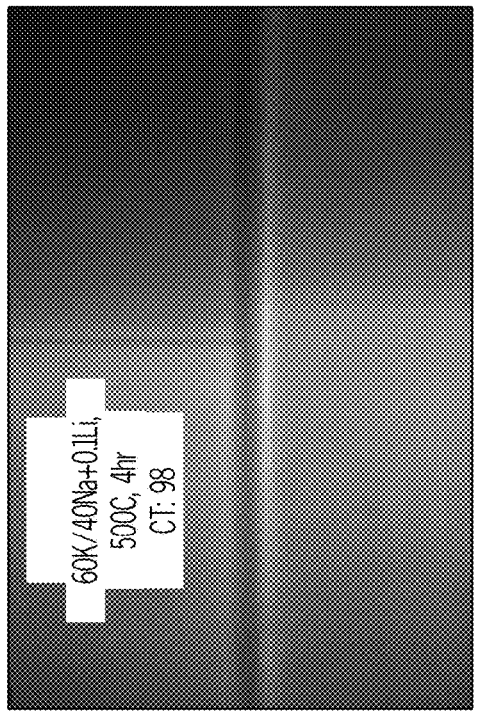

In FIG. 10A, the glass ceramic article was subjected to a treatment including 90 wt % $KNO_3$, 10 wt % $NaNO_3$ and 0.1 wt % $LiNO_3$ at 500° C. for 12 hours. The resultant glass ceramic article had a maximum central tension of 84 MPa. The glass ceramic article was then subjected to a treatment including 60 wt % $KNO_3$, 40 wt % $NaNO_3$ and 0.1 wt % $LiNO_3$ at 500° C. for 4 hours. The resultant glass ceramic article had a maximum central tension of 103 MPa. As shown by comparing FIGS. 10A and 10B, the first step showed well-developed fringes (FIG. 10A), while the second step increased the ion exchange of sodium ions and increased the central tension including maximum central tension (FIG. 10B). However, after the second step, the fringes began to lose contrast (or "bleach out") due to increased sodium ion exchange, which lowered the refractive index of the surface layer.

Figure 10C:
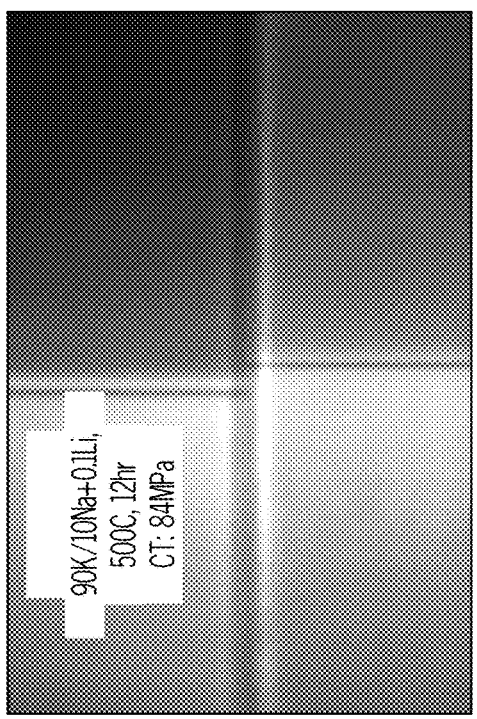
Figure 10D:
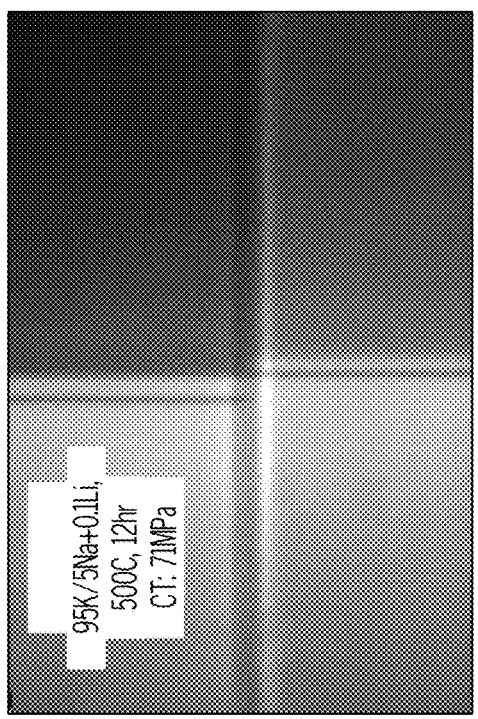

In FIG. 10C, the glass ceramic article was subjected to a treatment including 95 wt % $KNO_3$, 5 wt % $NaNO_3$ and 0.1 wt % $LiNO_3$ at 500° C. for 12 hours. The resultant glass ceramic article had a maximum central tension of 71 MPa. The glass ceramic article was then subjected to a treatment including 60 wt % $KNO_3$, 40 wt % $NaNO_3$ and 0.1 wt % $LiNO_3$ at 500° C. for 4 hours. The resultant glass ceramic article had a maximum central tension of 98 MPa. As with FIGS. 10A and 10B, the first step showed well-developed fringes (FIG. 10C), while the second step increased the ion exchange of sodium ions and increased the central tension including the maximum central tension (FIG. 10D). Again, after the second step, the fringes began to lose contrast (or "bleach out") due to increased sodium ion exchange, which lowered the refractive index of the surface layer.

Figure 10E:
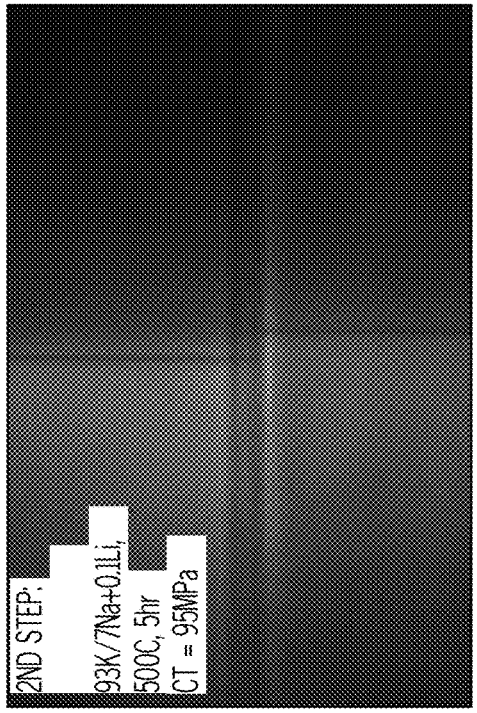
Figure 10F:
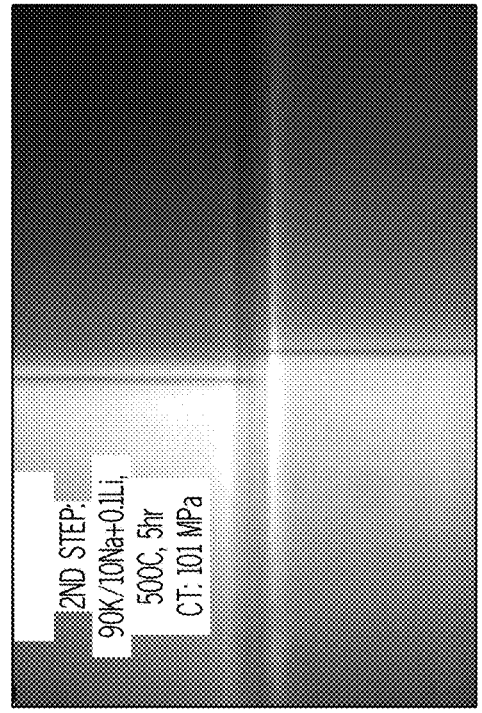

In FIG. 10E, the glass ceramic article was subjected to a treatment including 60 wt % $KNO_3$, 40 wt % $NaNO_3$ and 0.1 wt % $LiNO_3$ at 500° C. for 7 hours. The resultant glass ceramic article had a maximum central tension of 100 MPa. The glass ceramic article was then subjected to a treatment including 93 wt % $KNO_3$, 7 wt % $NaNO_3$ and 0.1 wt % $LiNO_3$ at 500° C. for 4 hours (FIG. 10F). The resultant glass ceramic article had a maximum central tension of 95 MPa. The high concentration of sodium salt in the first step created a compressive stress with a deep DOC (FIG. 10E), while the potassium fringe was developed during the second step (FIG. 10F) that included a high concentration of potassium salt.

Figure 10G:
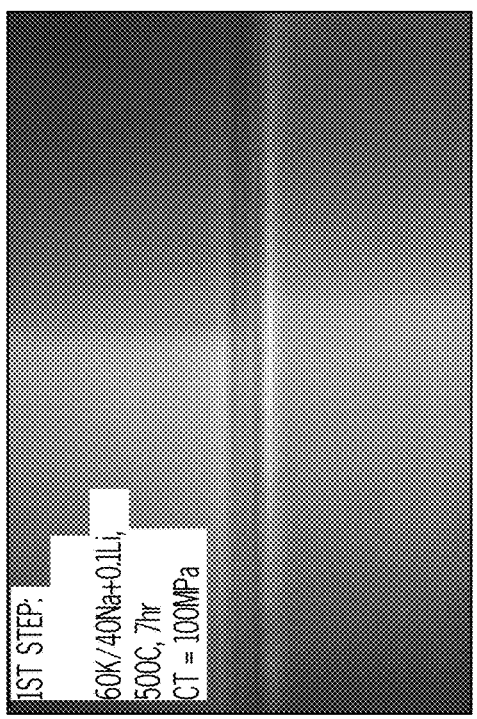
Figure 10H:
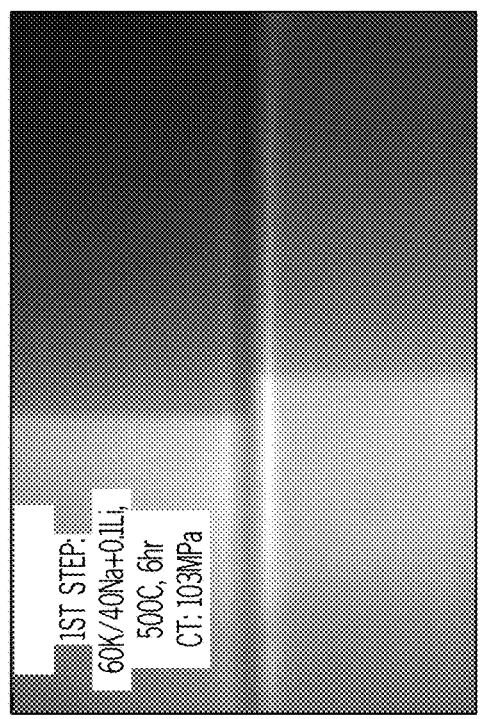

In FIG. 10G, the glass ceramic article was subjected to a treatment including 60 wt % $KNO_3$, 40 wt % $NaNO_3$ and 0.1 wt % $LiNO_3$ at 500° C. for 6 hours. The resultant glass ceramic article had a maximum central tension of 103 MPa. The glass ceramic article was then subjected to a treatment including 90 wt % $KNO_3$, 10 wt % $NaNO_3$ and 0.1 wt % $LiNO_3$ at 500° C. for 5 hours. The resultant glass ceramic article had a maximum central tension of 101 MPa. As with FIGS. 10E and 10F, the concentration of sodium salt in the first step created a compressive stress with a deep DOC (FIG. 10G), while the potassium fringe was developed during the second step (FIG. 10H) that included a high concentration of potassium salt.

Example 4

Glass and glass ceramic articles were subjected to one of various ion exchange treatments and damage resistance was measured. Ion exchange conditions, stress profile characteristics, and strength (Fracture) testing values are provided in Table 2 below. All samples had a thickness of 0.8 mm.

Sample A was a glass article having a nominal composition in mol % of: 71 $SiO_2$; 1.9 $B_2O_3$; 12.8 $Al_2O_3$; 2.4 $Na_2O$; 8.2 $Li_2O$; 2.9 MgO; 0.8 ZnO; 0.02 $Fe_2O_3$; 0.01 $ZrO_2$; 0.06 $SnO_2$, and subjected to a conventional IOX treatment. Sample B was a glass article having a nominal composition in mol % of: 58.4 $SiO_2$; 6.1 $B_2O_3$; 17.8 $Al_2O_3$; 1.7 $Na_2O$; 0.2 $K_2O$; 10.7 $Li_2O$; 4.4 MgO; 0.6 CaO; 0.02 $Fe_2O_3$; 0.01 $ZrO_2$; 0.08 $SnO_2$, and subjected to a conventional IOX treatment. Sample C was a glass ceramic article formed from Composition A and subjected to a conventional 2-step IOX treatment. Sample D was a glass ceramic article formed from Composition A and subjected to a single fringe IOX treatment according to various embodiments. Sample E was a glass ceramic article formed from Composition A and subjected to a two-step single fringe IOX treatment according to various embodiments. Sample F was a glass ceramic article formed from Composition A and subjected to a different two-step single fringe IOX treatment according to various embodiments. Sample G was a glass ceramic article formed from Composition A and subjected to a different two-step single fringe IOX treatment according to various embodiments.

TABLE 2

| Sample | $KNO_3$ (wt %) | $NaNO_3$ (wt %) | $LiNO_3$ (wt %) | Temp (° C.) | Time (h) | CT (MPa) | Fracture (MPa) |
|---|---|---|---|---|---|---|---|
| A | 93.5 | 6.5 | 0 | 430 | 4.5 | 86 | 195 |
| B | 88.2 | 11.8 | 2 | 450 | 8.4 | 105 | 235 |
| C | 30 | 70 | 0.05 | 470 | 12 | 114 | — |
|   | 30 | 70 | 0 | 470 | 1.5 | 124 | 334 |
| D | 90 | 10 | 0.1 | 500 | 13 | 85 | 239 |
| E | 60 | 40 | 0.1 | 500 | 6 | 103 | — |
|   | 90 | 10 | 0.1 | 500 | 4 | 101 |  |
| F | 60 | 40 | 0.1 | 500 | 7 | — | — |
|   | 93 | 7 | 0.1 | 500 | 5 | 92 | 271 |
| G | 60 | 40 | 0.1 | 500 | 10 | — | — |
|   | 93 | 7 | 0.1 | 500 | 5 | 90 | 258 |

Strength, reported as Fracture in Table 2, was measured by applied fracture stress to failure with a 4 point bending test after introducing about 80 μm deep flaws using sand paper impact via an 80 grit slapper. Testing was performed using an apparatus comprising a simple pendulum-based dynamic impact test having a surface ranging from flat to curved, where the glass ceramic article test specimen is mounted to a bob of a pendulum, which is then used to cause the test specimen to contact a roughened impact surface. The apparatus is described in detail in International Application Publication No. WO2017100646, which is hereby incorporated by reference in its entirety. To perform the test, the sample is loaded on the holder and then pulled backwards from the pendulum equilibrium position and released to make a dynamic impact on the impact surface. The impact surface included an abrasive sheet attached to the impact surface, in the form of sandpaper having the grit specified in the examples. The sandpaper was cut in 25 mm square pieces, and the sandpaper was flattened if the pieces were bent during the cutting process.

The radius of curvature of the curved surface on the base was selected to provide a bending tensile force of 100 MPa when the substrate was bent around the curved surface such that the tensile force was an externally applied tensile force resulting from the stress of bending the substrate.

Example 5

Figure 11:
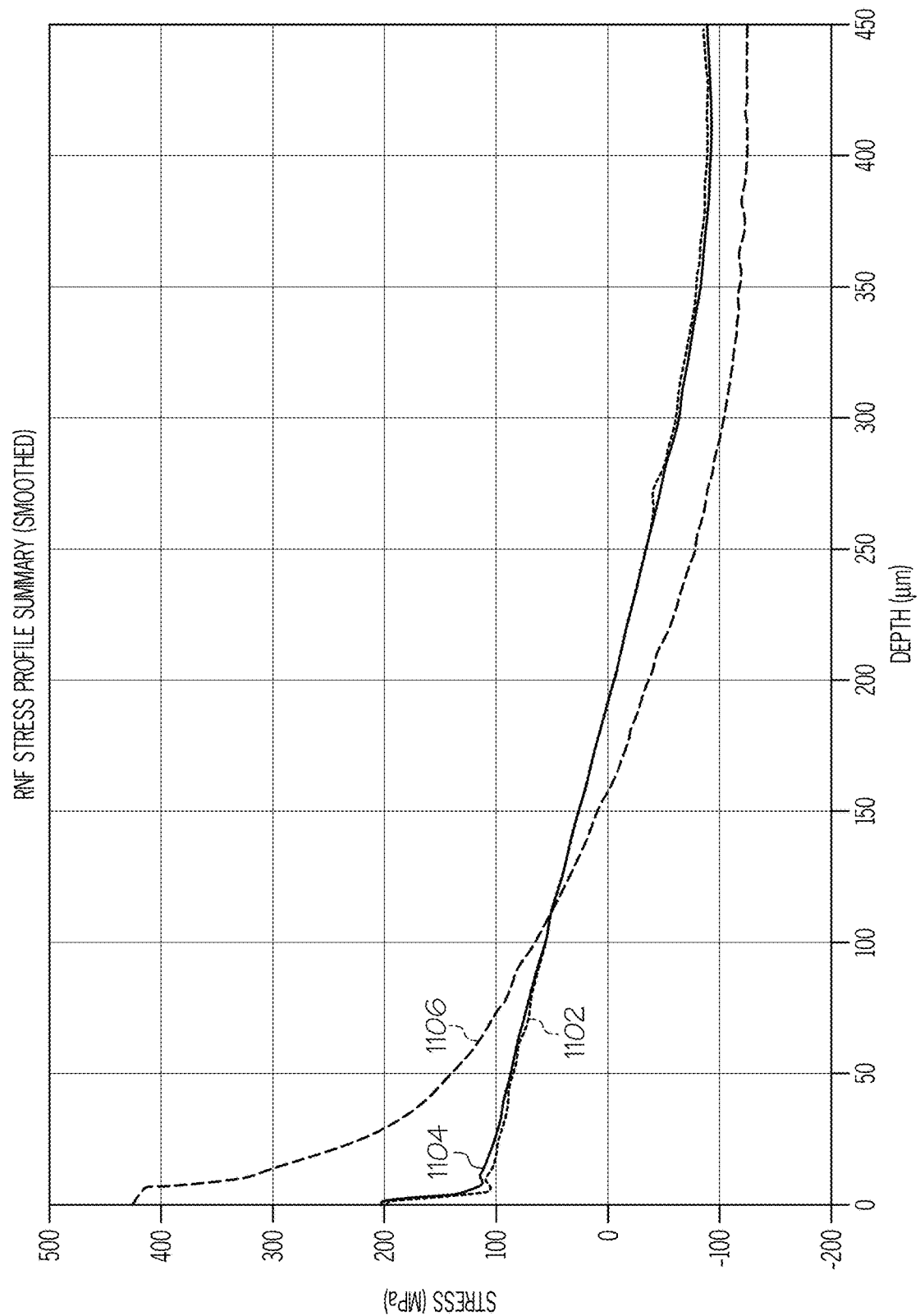
FIG. 11 is a plot of the stress (Y-axis, in MPa; compressive stress is positive and tensile stress is negative) as a function of depth into the thickness of the sample from the surface (X-axis; in micrometers or μm) measured using RNF of glass ceramic articles subjected to a single fringe ion exchange treatment according to one or more embodiments shown and described herein.

Next, glass ceramic articles formed from Composition A were subjected to ion exchange treatments and their stress profiles were measured using RNF. The results are shown in FIG. 11. The glass ceramic article formed from Composition A treated with single fringe ion exchange with a 60 wt % $KNO_3$, 40 wt % $NaNO_3$ and 0.1 wt % $LiNO_3$ at 500° C. for 10 hours followed by 93 wt % $KNO_3$, 7 wt % $NaNO_3$ and 0.1 wt % $LiNO_3$ at 500° C. for 5 hours (same as Sample G from Table 2) exhibited stress profile 1102. The glass ceramic article formed from Composition A treated with single fringe ion exchange with a 60 wt % $KNO_3$, 40 wt % $NaNO_3$ and 0.1 wt % $LiNO_3$ at 500° C. for 7 hours followed by 93 wt % $KNO_3$, 7 wt % $NaNO_3$ and 0.1 wt % $LiNO_3$ at 500° C. for 5 hours (same as Sample F from Table 2) exhibited stress profile 1104. A glass ceramic article formed from Composition A treated with a conventional ion exchange treatment with a bath comprising 30 wt % $KNO_3$, 70 wt % $NaNO_3$ and 0.05 wt % $LiNO_3$ at 470° C. for 12 hours followed by 30 wt % $KNO_3$, 70 wt % $NaNO_3$ at 470° C. for 1.5 (same as Sample C from Table 2) hours exhibited stress profile 1106. As shown in FIG. 11, the stress in both profiles 1102 and 1104 decreases with increasing distance from an outer surface of the glass ceramic article from a compressive stress to a tensile stress.

Stress profile 1106 of the glass ceramic article having a low-index layer has a high compressive stress (e.g., above 80 MPa) from the surface to a depth of 0.1t or more, where t is the thickness of the glass ceramic. However, stress profiles 1102 and 1104 have increased compressive stress at depths exceeding 120 μm, or 0.15t. Specifically, the increased compressive stress is a compressive stress greater than or equal to 40 MPa at a depth of 0.15t, greater than or equal to 30 MPa at a depth of 0.19t, greater than or equal to 20 MPa at a depth of 0.19t. Additionally, stress profiles 1102 and 1104 exhibit substantially higher depths of compression, exceeding 0.20t, 0.21t, or 0.22t.

Stress profiles 1102 and 1104 also include a well-defined knee stress $CS_k$ that occurs in the depth range following the spike. Without being bound by theory, it is believed that the knee stress results from the stabilization of the potassium concentration to the same level as within the interior of the sample. The value of the $CS_k$ is from 100 to 150 MPa. It should be understood that the $CS_k$ can be from 100 MPa to 150 MPa, from 100 MPa to 140 MPa, from 100 MPa to 130 MPa, from 100 MPa to 120 MPa, from 100 MPa to 110 MPa, from 110 MPa to 150 MPa, from 110 MPa to 140 MPa, from 110 MPa to 130 MPa, from 110 MPa to 120 MPa, from 120 MPa to 150 MPa, from 120 MPa to 140 MPa, from 120 MPa to 130 MPa, from 130 MPa to 150 MPa, from 130 MPa to 140 MPa, from 140 MPa to 150 MPa, or any and all sub-ranges formed from any of these endpoints. For example, in embodiments with slightly lower $LiNO_3$ content (e.g., 0.09 wt %, 0.08 wt %, or 0.07 wt %) in the last ion exchange step, higher values for the $CS_k$ can be obtained without forming a low-index layer on the surface.

In various embodiments, a $CS_k$ value of greater than 70 MPa, 80 MPa, or even 90 MPa can provide enhanced fracture resistance during drop events on a moderately rough surface. Without being bound by theory, it is believed that tensile stresses for example 70 MPa and 80 MPa occur near the surface and at depths as high as 30-40 μm during a drop on a rough surface from a height of 1 m or higher. Accordingly, in various embodiments, the ion-exchanged glass ceramic article has a $CS_k$ value of greater than 70 MPa. In various embodiments, the $CS_k$ is measured via measurement in the birefringence of the critical-angle transition in the prism-coupling (FSM) spectra, where birefringence is directly correlated with $CS_k$.

As shown in FIG. 11, stress profiles 1102 and 1104 further show surface spikes of compressive stress. Without being bound by theory, it is believed that the surface spike is due to increased concentration of potassium ions, and not sodium ions. In particular, the potassium penetration in these samples falls from about 5 μm to about 12 μm, correlating with the low potassium concentration and the single fringe FSM spectrum for each polarization.

The stress at the surface visible in the plots shown in FIG. 11 is not considered accurate due to limited resolution of the refracted near field (RNF) method which limits the accuracy of representing the spike where stress varies greatly over a very small distance. Accordingly, in various embodiments, surface stress is measured or estimated using prism-coupling measurements whenever possible. When the low-index surface layer is avoided but the surface is enriched in potassium ions, the average compressive stress in the spike region for the samples corresponding to stress profiles 1102 and 1104 is from 150 MPa to about 300 MPa, while the surface stress is from about 200 MPa to about 490 MPa. The upper limit was determined by ion-exchanging samples for a substantially longer time in order to obtain a two-fringe spectrum, measuring the surface compressive stress using conventional means for measuring surface compressive stress with a two-fringe spectrum, and then correcting for the decrease in compressive stress that occurred as a result of the extra-long ion-exchange time. Without being bound by theory, the surface compressive stress and the central tension, including maximum central tension, are sensitive to the amount of $LiNO_3$ in the bath, with the compressive stress progressively decreasing from the range of 400-490 MPa for $LiNO_3$ concentrations in the range of 0.05 wt % to 0.07 wt % to 350-450 MPa for $LiNO_3$ concentrations in the range of 0.07 wt % to 0.12 wt %, to 250-400 MPa for even higher $LiNO_3$ concentrations. It should be understood that the particular compressive stress values vary within the ranges depending on the Na/K ratio within the bath, where the highest values are obtained for baths with low concentrations of $NaNO_3$ (e.g., <5 wt %) and high concentrations of $KNO_3$ (e.g., >95 wt %) in the last ion-exchange step.

Moreover, stress profiles 1102 and 1104 have a second derivative that is very small in the region between the bottom of the potassium-enriched surface spike and a depth substantially exceeding the depth of compression. This substantially linear region extends to depths of greater than 0.25t to 0.4t. For example, as shown in FIG. 11, the substantially linear region of the profile exceeds 200 μm, and even exceeds 240 μm, 280 μm, or even 320 μm. The start of the substantially linear region is less than 50 μm, and can be seen as low as 35 μm, 20 μm, 15 μm, or even 10 μm depending on the particular embodiment. In contrast, stress profile 1106 has a very high second derivative in the first 0.1t, or 80 μm. The phrase "substantially linear" means that the absolute value of the second derivative of the stress profile in the region of interest does not exceed a limit that is proportional to the average slope of the region, where the limit is 10 inverse mm. In some embodiments, the limit may be set to 9, 8, 7, 6, or 5 inverse mm in order to obtain a better approximation of the linear profile segment.

Stress profile 1102 has an average slope of about 580 MPa/mm, while the second derivative stays between −3000 and 3000 MPa per square mm in the depth range from 20 to 240 μm (0.025 to 0.3t). Hence, the ratio of the absolute value of the second derivative to the absolute value of the first derivative is less than 6 over the specified depth range. In the depth range from 40 to 200 μm (0.05 to 0.25t), the ratio is lower than 5.

In various embodiments, the second derivative in a region of interest is estimated by obtaining a close polynomial fit to the profile in the region of interest, and then taking the derivative of the polynomial fit. This method can enable noise that usually occurs when calculating the direct second derivative of the experimental profile by finite differences to be reduced or even eliminated. However, in some embodiments, it may be difficult to obtain a close polynomial fit (e.g., a polynomial fit with an $R^2$ greater than or equal to 0.999). In such embodiments, another aspect of the substantially linear segment may be considered, for example that the local slope does not vary significantly over the range of the segment. For example, stress profile 1102 has a slope that does not fall below 470 MPa/mm and does not exceed 640 MPa/mm in the region of interest, so the total variation in slope of less than 170 MPa/mm does not exceed 30% of the average slope in the region. Accordingly, in some embodiments, "substantially linear" means that the total variation in slope does not exceed 30%, 25%, 20%, or 15% of the average slope.

Stress profile 1104 has an average slope in the deep region of interest (excluding the spike region) that is slightly higher than that of stress profile 1102. In particular, the average slope is from 600 to 670 MPa/mm. As with stress profile 1102, the substantially linear region of stress profile 1104 extends from a lower limit of 30, 25, 20, or 15 μm to an upper limit of 320, 300, 280, 240, or 200 μm, depending on the particular condition of substantially linear profile being observed. The upper limits represent a large portion of the thickness (e.g., 0.25t, 0.3t, 0.35t, 0.37t, or even 0.4t). Accordingly, in various embodiments, the stress profile of the ion exchanged glass ceramic article has a substantially linear region that spans a range of 0.02t to 0.4t with a width greater than 0.25t or 0.3t, even when the strictest condition of a substantially linear profile is observed.

Stress profiles 1102 and 1104 also show that the peak central tension (which is the maximum central tension in the examples shown) is from 60 MPa to 120 MPa. In some embodiments, the peak central tension is less than 108 MPa or 102 MPa. Without being bound by theory, it is believed that peak central tension values of less than 120 MPa, or even 108 MPa, can reduce or eliminate the formation of the low-index surface layer and/or chemical durability challenges. It is further believed that reducing the $LiNO_3$ content from 0.1 wt % to 0.09 wt %, 0.08 wt %, or even 0.07 wt % can increase the peak central tension. Additionally, it is believed that higher central tension levels, including higher maximum central tension, may be attained by more diligent control of the composition of the ion exchange bath, and especially the $LiNO_3$ content.

As shown in FIG. 11, stress profiles 1102 and 1004 also have a depth integral of compressive stress in each compression region from 9.9 to 12.5 MPa*mm, and an average stress in the compression region from 52 MPa to 66 MPa. The total compressive stress integral over the two compression regions, when divided by the thickness of 0.8 mm, is from 23.5 MPa to 31.3 MPa for both stress profiles 1102 and 1004. However, slightly higher stress integrals of up to 16 MPa*mm are possible when the $LiNO_3$ content of the ion exchange bath is decreased to 0.06-0.09 wt %, and slightly lower stress integrals of 8 MPa*mm are obtained as the $LiNO_3$ content of the bath increases as a result of ion exchanging multiple parts. Accordingly, by varying the $LiNO_3$ content of the bath, the average compressive stress in the compression region may be varied from 85 MPa (at levels of $LiNO_3$ of from 0.06-0.08 wt %) to 45 MPa (at levels of $LiNO_3$ of 0.2 to 0.3 wt %). In various embodiments, the total compressive stress integral of the two compression regions (e.g., near each opposing surface of the glass ceramic article), when divided by the thickness of the glass ceramic article, is in a range of from 20 MPa to 40 MPa. It should be understood that the same values and ranges for the thickness-normalized stress will apply to the thickness-normalized stress integral over the tension region, due to the balancing of forces between the compression and tension regions.

Example 6

Glass ceramic articles were subjected to various no fringe ion exchange treatments and their stress profiles were measured using RNF. In particular, stress profile 1202 corresponds to a glass ceramic article formed from Composition A and treated with 60 wt % $KNO_3$, 40 wt % $NaNO_3$, and 0.1 wt % $LiNO_3$ at 500° C. for 8 hours. Stress profile 1204 corresponds to a glass ceramic article formed from Composition A and treated with 70 wt % $KNO_3$, 30 wt % $NaNO_3$, and 0.1 wt % $LiNO_3$ at 470° C. for 8 hours (Sample O, below). Stress profile 1206 corresponds to a glass ceramic article formed from Composition A and treated with 70 wt % $KNO_3$, 30 wt % $NaNO_3$, and 0.1 wt % $LiNO_3$ at 470° C. for 13 hours (Sample P, below). Finally, stress profile 1208 corresponds to a glass ceramic article formed from Composition A and treated with a conventional ion exchange treatment including a first step at 30 wt % $KNO_3$, 70 wt % $NaNO_3$, and 0.05 wt % $LiNO_3$ at 470° C. for 12 hours and a second step at 30 wt % $KNO_3$ and 70 wt % $NaNO_3$ at 470° C. for 1.5 hours (same as Sample C from Table 2).

Figure 12:
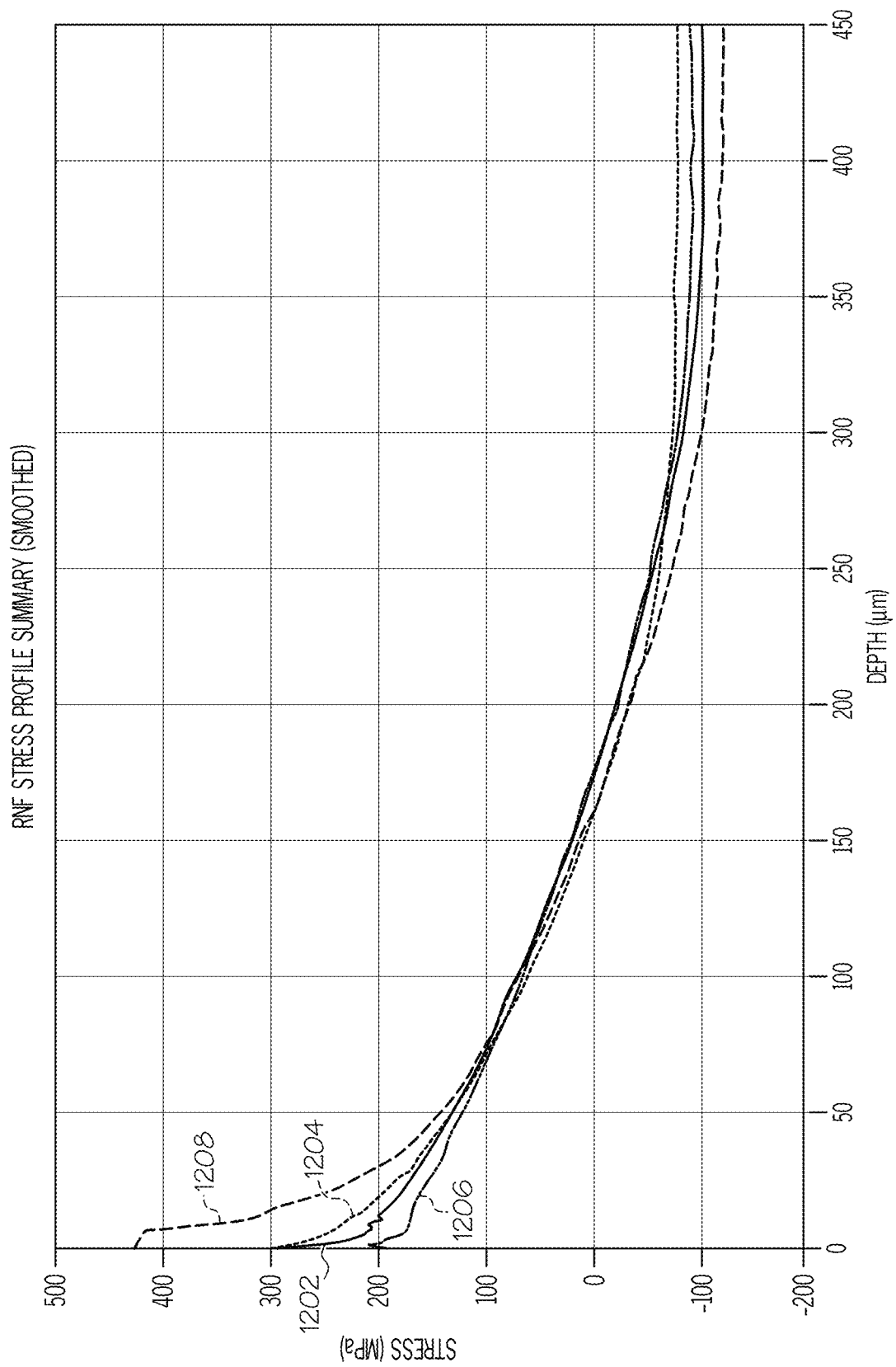
FIG. 12 is a plot of the stress (Y-axis, in MPa; compressive stress is positive and tensile stress is negative) as a function of depth into the thickness of the sample from the surface (X-axis; in micrometers or μm) measured using RNF of glass ceramic articles subjected to a no fringe ion exchange treatment according to one or more embodiments shown and described herein.

As shown in FIG. 12, each of the stress profiles includes a depth of compression of about 20% of the thickness of the glass ceramic article (0.8 mm for each sample). Stress profile 1202 has a generally positive second derivative for CS(z), though it also includes a substantially linear region that extends from a depth of 50 μm to 240 μm (0.05t to 0.3t) or, more strictly, from 56 μm to 208 μm (0.07t to 0.26t). The average stress slope in the substantially linear region is about 1000 MPa/mm, and the depth of compression is about 0.17 mm (0.21t). The maximum central tension is 107 MPa. Stress profile 1202 also has a high $CS_k$ in the range of 210 to 220 MPa, and a depth integral of the compressive stress in the compression region equal to 16 MPa*mm. The integral of the tensile stress over the tension region is 32 MPa*mm, balancing the sum of the depth integrals of the compression regions on both sides of the tension region. The ratio of total compressive stress integral to the thickness is 40 MPa. Additionally, the average compressive stress in the compression region is 94 MPa, which is obtained by dividing the depth integral of compressive stress from z=0 at the surface to the DOC (0.17 mm for stress profile 1202) by the depth range from 0 to DOC. This average compressive stress is substantially the same when the profile is scaled with thickness (e.g., by reducing the ion-exchange time in proportion to the square of the thickness).

As shown in FIG. 12, stress profile 1204 is also characterized by a continuous positive second derivative throughout the compression region and through most of the tension region on the interior of the glass ceramic article. The compressive stress integral over each compression zone is 15.6 MPa*mm. The total stress integral (either compressive stress or tensile stress, due to stress balancing) divided by the thickness (0.8 mm) is 39 MPa. The average compressive stress in the compression zone is 99.4 MPa, and, as above, is substantially the same when the profile is scaled with thickness.

Stress profile 1204 has a generally higher absolute value of the second derivative, and a small portion of it (from about 80 μm to about 200 μm, or 0.1t to 0.25t) is substantially linear. Stress profile 1204 also has a somewhat lower compressive stress at depths exceeding 60 μm and higher compressive stress at depths below 50 μm as compared to stress profile 1202.

However, both stress profiles 1202 and 1204 have a highest second derivative of the function CS(z) for the first 200 μm (or 0.25t) occurring in the first 50 μm (or 0.06t). More specifically, excluding the potassium-enriched region of the first 10 μm, the highest second derivative occurs between the depths of 12 μm and 40 μm. The highest second derivative of each of stress profiles 1202 and 1204 is significantly smaller (from 25,000 to 40,000 MPa/mm² for stress profile 1202 and from 40,000 to 70,000 MPa/mm² for stress profile 1204) than that of stress profile 1208, which has a highest second derivative in the first 50 μm that is twice as high as that of stress profile 1204 or more. It should be noted that higher second derivatives, for example up to 100,000 MPa/mm², can be obtained when the $LiNO_3$ concentration in the last ion exchange step is lower than 0.1 wt %, and can be obtained without forming the low-index surface layer when then the $LiNO_3$ concentration is greater than 0.06 or 0.07 wt % and less than 0.1 wt %.

Stress profiles 1202 and 1204 can further be characterized by the range of slopes observed in the compression zone. In various embodiments, the slope of the surface in the potassium-enriched region having a depth of about 10 μm is not included. In particular, stress profile 1202 has a $CS_k$ from 210 to 220 MPa, and a negative slope of CS(z) that changes monotonically from −2650 MPa/mm in the depth range from 10 to 20 μm to about −1430 MPa/mm at a depth of 50 μm. The negative slope of CS(z) then changes more slowly to −880 MPa/mm at the DOC of 170 μm. Stress profile 1204 begins with a higher slope of about −3830 MPa/mm in the depth range from 10 to 20 μm and changes fast to about −1610 MPa/mm at a depth of 50 μm, then changes more slowly to reach about −950 MPa/mm at the DOC of 157 μm. Stress profile 1202 has a maximum central tension of 107 MPa, while stress profile 1204 has a substantially lower maximum central tension of 77 MPa.

Each of the stress profiles 1202 and 1204 exhibits a compressive stress that is simultaneously high both at a first depth of about 40 μm (0.05t) and a second depth of 120 μm (0.15t), where the compressive stress is greater than 100 MPa at the first depth and greater than 30 MPa at the second depth. Without being bound by theory, it is believed that this can provide substantial protection against both higher-stress events acting on shallow to intermediate depth flaws and against lower to moderate stress events acting on deep flaws.

Stress profile 1206 has a DOC of 0.17 mm, and the compressive stress depth integral over each compression region is equal to 14.4 MPa*mm. The average compressive stress in the compression region is 84.7 MPa, and the total stress integral divided by the thickness (0.8 mm) is 36 MPa. Beyond the potassium-enriched surface layer, stress profile 1206 has characteristics similar to stress profiles 1102 and 1104 in FIG. 11, except for a slightly smaller DOC. In particular, like stress profiles 1102 and 1104, stress profile 1206 has an extended substantially linear region, indicating that the no fringe ion exchange treatment described herein can provide a similar stress profile, and, therefore, similar fracture resistance, without the need to generate a 1-fringe spike for use in quality control. Additionally, compared to stress profiles 1102 and 1104, stress profile 1206 has a substantially higher $CS_k$ at about 170 MPa. As a result, the average compressive stress in the compression region for stress profile 1206 is somewhat higher than in stress profiles 1102 and 1104, which have a higher DOC.

Example 7

Glass and glass ceramic articles were subjected to one of various ion exchange treatments and damage resistance was measured. Ion exchange conditions, stress profile characteristics, and strength (Fracture) testing values are provided in Table 3 below.

Sample H was a glass article having the same properties and subject to the same ion exchange conditions as Sample A, above. Sample I was a glass article having the same properties and subject to the same ion exchange conditions as Sample B, above. Sample J was a glass ceramic article formed from Composition A and subjected to a conventional 2-step IOX treatment (same as Sample C, above). Samples K, L, and M were glass ceramic articles formed from Composition A and subjected to a no fringe IOX treatment according to various embodiments for 4, 8, or 12 hours, respectively. Samples N, O, P, and Q were glass ceramic articles formed from Composition A and subjected to a different no fringe IOX treatment according to various embodiments for 4, 8, 13, or 16 hours, respectively. Samples R, S, and T were glass ceramic articles formed from Composition A and subjected to a different no fringe IOX treatment according to various embodiments for 4, 8, or 16 hours, respectively.

TABLE 3

| Sample | $KNO_3$ (wt %) | $NaNO_3$ (wt %) | $LiNO_3$ (wt %) | Temp (° C.) | Time (h) | CT (MPa) | CS (MPa) | Fracture (MPa) |
|---|---|---|---|---|---|---|---|---|
| H | 93.5 | 6.5 | 0 | 430 | 4.5 | 86 | 660 ±20 | 195 |
| I | 88.2 | 11.8 | 2 | 450 | 8.4 | 105 | 600 | 235 |
| J | 30 | 70 | 0.05 | 470 | 12 | 114 | 350 | — |
|   | 30 | 70 | 0 | 470 | 1.5 | 124 | 426 | 334 |
| K | 60 | 40 | 0.1 | 500 | 4 | 78 | 305 | 300 |
| L | 60 | 40 | 0.1 | 500 | 8 | 107 | 295 | 325 |
| M | 60 | 40 | 0.1 | 500 | 12 | 108 | 262 | 304 |
| N | 70 | 30 | 0.1 | 470 | 4 | 53 | 308 | 286 |
| O | 70 | 30 | 0.1 | 470 | 8 | 77 | 290 | 309 |
| P | 70 | 30 | 0.1 | 470 | 13 | 94 | 266 | 288 |
| Q | 70 | 30 | 0.1 | 470 | 16 | 97 | 236 | 307 |
| R | 50 | 50 | 0.1 | 470 | 4 | 59 | 330 | — |
| S | 50 | 50 | 0.1 | 470 | 8 | 105 | 285 | — |
| T | 50 | 50 | 0.1 | 470 | 16 | 84 | 299 | — |

Figure 13:
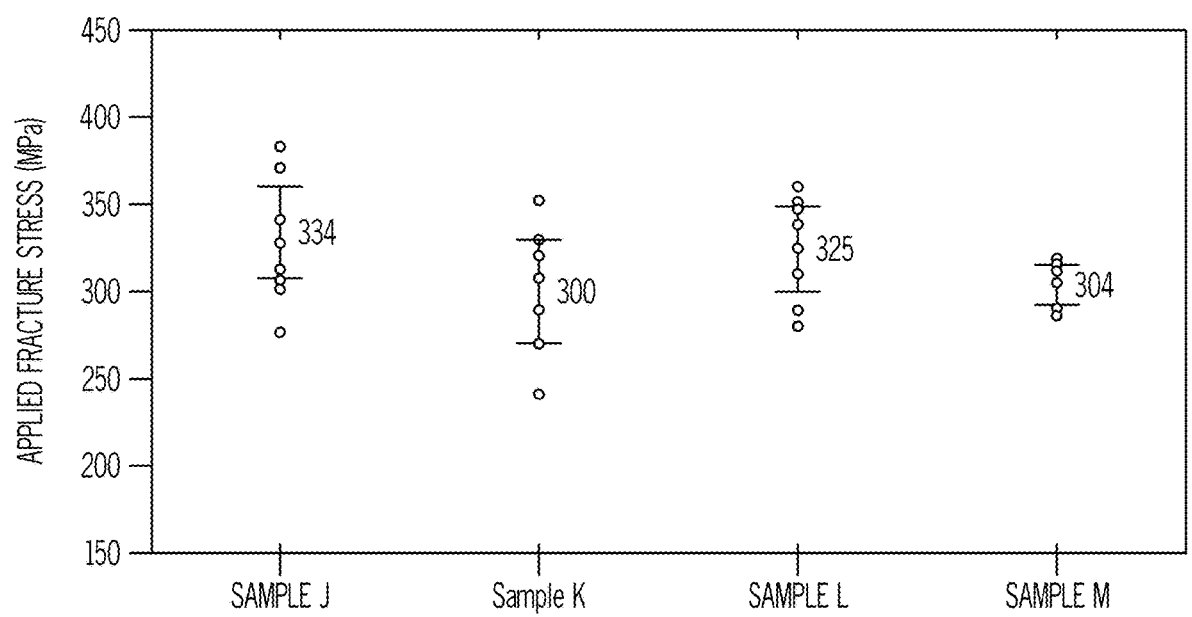
FIG. 13 is a plot of the applied fracture stress (Y-axis; in MPa) for samples (X-axis) subjected to various ion exchange treatments according to one or more embodiments shown and described herein and tested using a four point bend test after damage introduction with 80 grit sandpaper.

Strength, reported as Fracture in Table 3, was measured by applied fracture stress to failure with a 4 point bending test after introducing about 80 μm deep flaws using impact via a slapper with an 80 grit sand paper. Fracture strength for Samples J, K, L, and M is plotted in FIG. 13. All of Samples J to T (made of Composition A) that do not form the degradation-prone low-index layer still significantly outperform comparative examples H and I, despite not having formed a low-index layer. These samples (J to T) having the resistance to surface degradation show mechanical performance that is generally closer to the strength of the glass-ceramic double ion exchange sample (Sample J) than to the glass examples of Samples H and I.

Example 8

Figure 14A:
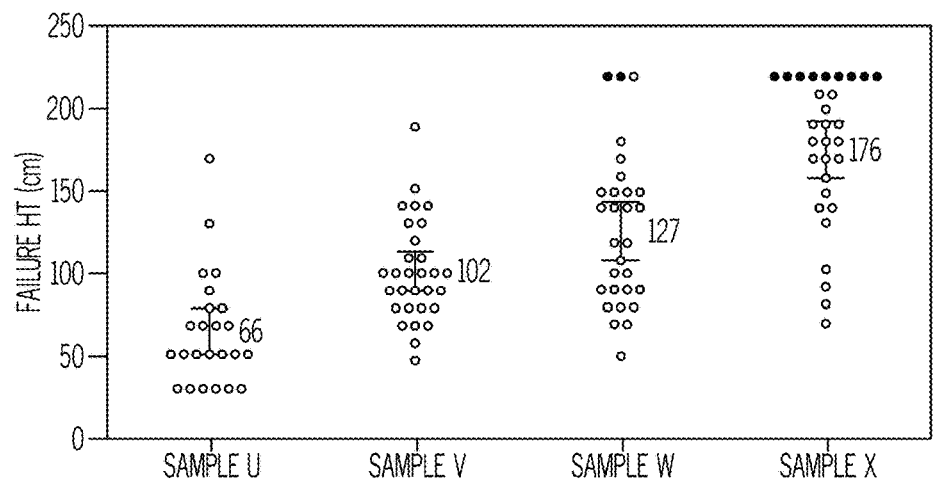
FIGS. 14A-14C are plots of the results of a progressive face drop test in which failure height is presented on the Y-axis (in cm) for samples (X-axis) subjected to various ion exchange treatments according to one or more embodiments shown and described herein.
Figure 14B:
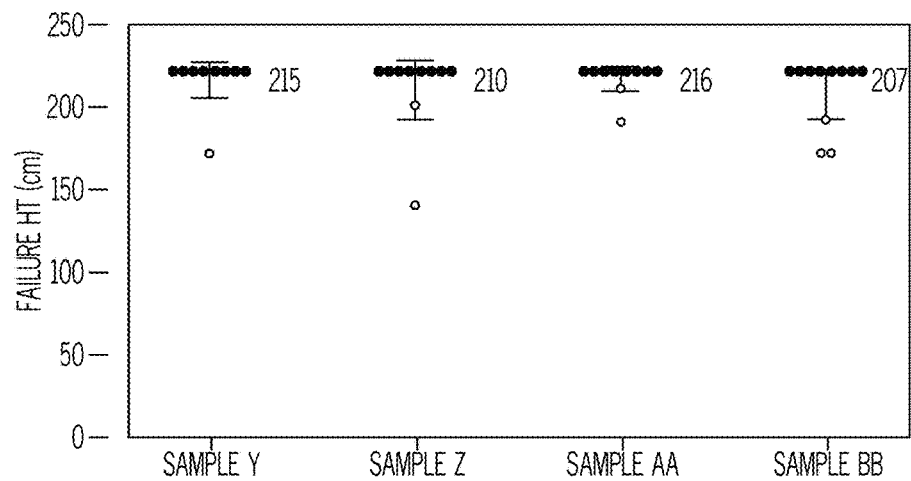
Figure 14C:
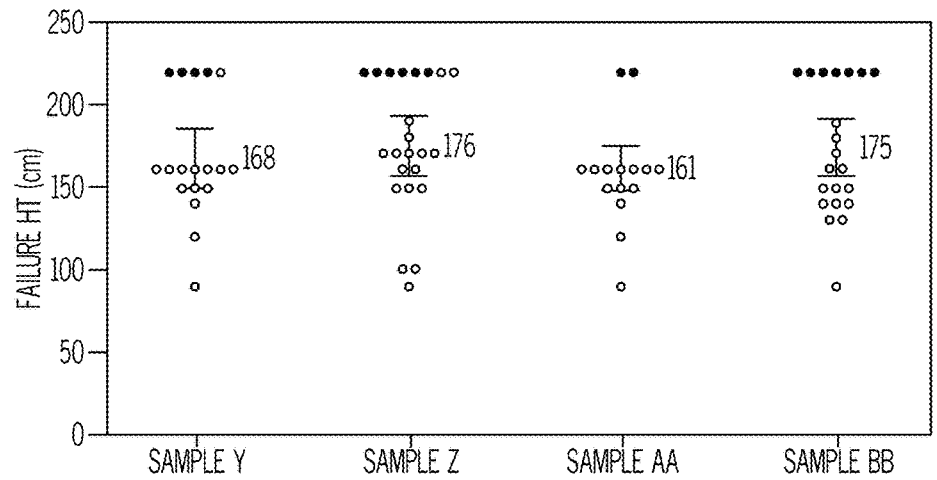

Glass and glass ceramic articles were subjected to one of various ion exchange treatments and damage resistance was measured using drop testing, and the results are presented in FIGS. 14A-14C. Glass-based articles according to Example U-BB were fitted onto identical puck devices, wherein the pucks were sized, shaped and weighted to simulate mobile phone devices. As used herein the term "glass-based" is meant to include any material made at least partially of glass, including glass, and glass-ceramics. The pucks were dropped in a horizontal orientation, with the glass-based material facing downward—flat face drop, from incremental heights starting at 20 centimeters onto 180 grit sandpaper. If a glass-based article survived the drop from one height (e.g., 20 cm), the puck was dropped again from a 10 cm incrementally greater height (e.g., 30 cm, 40 cm, 50 cm, etc.) up to a height of 225 cm. The surviving glass-based articles were then dropped onto 80 grit sandpaper (in the same phone devices). The height at which the glass-based article failed on both 180 grit sandpaper and 80 grit sandpaper is plotted in FIGS. 14A-C.

FIG. 14A shows the results of the incremental flat face drops on 80 grit sandpaper for Samples U, V, W, and X. Sample U was a glass article formed from Composition 7418 (having nominal composition in mol % of: 63.6 $SiO_2$; 2.3 $B_2O_3$; 15 $Al_2O_3$; 9.3 $Na_2O$; 5.9 $Li_2O$; 1.2 ZnO; 0.05 $SnO_2$, 2.53 $P_2O_5$), Sample V was a glass article formed from a nominal composition in mol % of: 71 $SiO_2$; 1.9 $B_2O_3$; 12.8 $Al_2O_3$; 2.4 $Na_2O$; 8.2 $Li_2O$; 2.9 MgO; 0.8 ZnO; 0.02 $Fe_2O_3$; 0.01 $ZrO_2$; 0.06 $SnO_2$, Sample W was a glass article formed from a nominal composition in mol % of: 58.4 $SiO_2$; 6.1 $B_2O_3$; 17.8 $Al_2O_3$; 1.7 $Na_2O$; 0.2 $K_2O$; 10.7 $Li_2O$; 4.4 MgO; 0.6 CaO; 0.02 $Fe_2O_3$; 0.01 $ZrO_2$; 0.08 $SnO_2$, and Sample X was a glass article formed from Composition A. Each of Samples U, V, W, and X was subjected to a conventional ion exchange treatment including a first step of treatment with a bath containing 70 wt % $NaNO_3$ and 30 wt % $KNO_3$ at 380° C. for 4 hours and a second step of treatment with a bath containing 7 wt % $NaNO_3$ and 93 wt % $KNO_3$ at 380° C. for 40 minutes.

FIGS. 14B and 14C show the results of the incremental flat face drops on 180 grit sandpaper and 80 grit sandpaper, respectively, for Samples Y, Z, AA, and BB. Each of Samples Y, Z, AA, and BB was formed from Composition A. Sample Y was subjected to a conventional two-step ion exchange treatment including a first step at 70 wt % $NaNO_3$, 30 wt % $KNO_3$ and 0.05 wt % $LiNO_3$ at 470° C. for 12 hours followed by 70 wt % $NaNO_3$ and 30 wt % $KNO_3$ at 470° C. for 1.5 hours (same as line 1106 and Example 4C, as well as similar to Example 2 conventional). Sample Z was subjected to a two-step no fringe ion exchange treatment including a first step at 40 wt % $NaNO_3$, 60 wt % $KNO_3$ and 0.1 wt % $LiNO_3$ at 500° C. for 6 hours followed by 10 wt % $NaNO_3$, 90 wt % $KNO_3$, and 0.1 wt % $LiNO_3$ at 500° C. for 5 hours (similar to line 1104, Example 4F). Sample AA was subjected to a one-step no fringe ion exchange treatment including 40 wt % $NaNO_3$, 60 wt % $KNO_3$ and 0.1 wt % $LiNO_3$ at 500° C. for 8 hours (same as Example 7L). Sample BB was subjected to a one-step no fringe ion exchange treatment including 30 wt % $NaNO_3$, 70 wt % $KNO_3$ and 0.1 wt % $LiNO_3$ at 470° C. for 8 hours (same as 7O and line 1204).

As shown in FIGS. 14A-C, all but two glass-based articles of Example U and V survived being dropped onto 80 grit sandpaper up to heights of about 250 cm (providing an average survival drop height of from 160 cm to 178 cm). Accordingly, FIGS. 14A-14C show that the ion-exchanged glass ceramic articles according to various embodiments herein exhibit statistically the same drop performance as glass articles chemically strengthened according to prior art ion exchange processes.

Example 9

To determine the effects of the no fringe ion exchange treatments according to various embodiments on aging and corrosion, glass ceramic articles were prepared and subjected one of various ion exchange treatments. Each of the glass ceramic articles was formed from Composition A. Ion exchange treatment conditions and accelerated aging test results are presented in Table 4 below. To determine the accelerated aging results, samples were placed into a chamber at 85° C. and 85% relative humidity for a period of time (reported in Table 4) and examined for corrosion.

TABLE 4

| Sample | KNO$_3$ (wt %) | NaNO$_3$ (wt %) | LiNO$_3$ (wt %) | Temp (° C.) | Time (h) | Accelerated Aging Result |
|---|---|---|---|---|---|---|
| CC | 30 | 70 | 0.1 | 470 | 12 | Severe Corrosion |
|  | 30 | 70 | 0 | 470 | 1 |  |
| DD | 70 | 30 | 0.1 | 470 | 13 | No corrosion (144 h) |
| EE | 60 | 40 | 0.1 | 500 | 12 | No corrosion (144 h) |
| FF | 60 | 40 | 0.1 | 500 | 7 | No corrosion (144 h) |
|  | 93 | 7 | 0.1 | 500 | 5 |  |
| GG | 60 | 40 | 0.1 | 500 | 10 | No corrosion (144 h) |
|  | 93 | 7 | 0.1 | 500 | 5 |  |
| HH | 50 | 50 | 0.1 | 470 | 4 | No corrosion (48 h) |
| II | 50 | 50 | 0.1 | 470 | 6 | No corrosion (48 h) |

As shown in Table 4, the no fringe IOX treatment described in various embodiments results in significantly improved accelerated aging results.

Figure 15A:
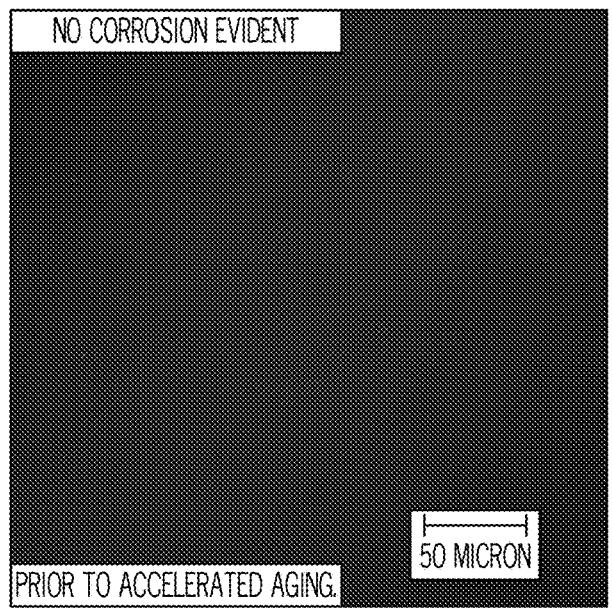
FIG. 15A is an optical micrograph of a glass ceramic article subjected to a conventional ion exchange treatment prior to exposure to 85° C./85% relative humidity aging conditions.
Figure 15B:
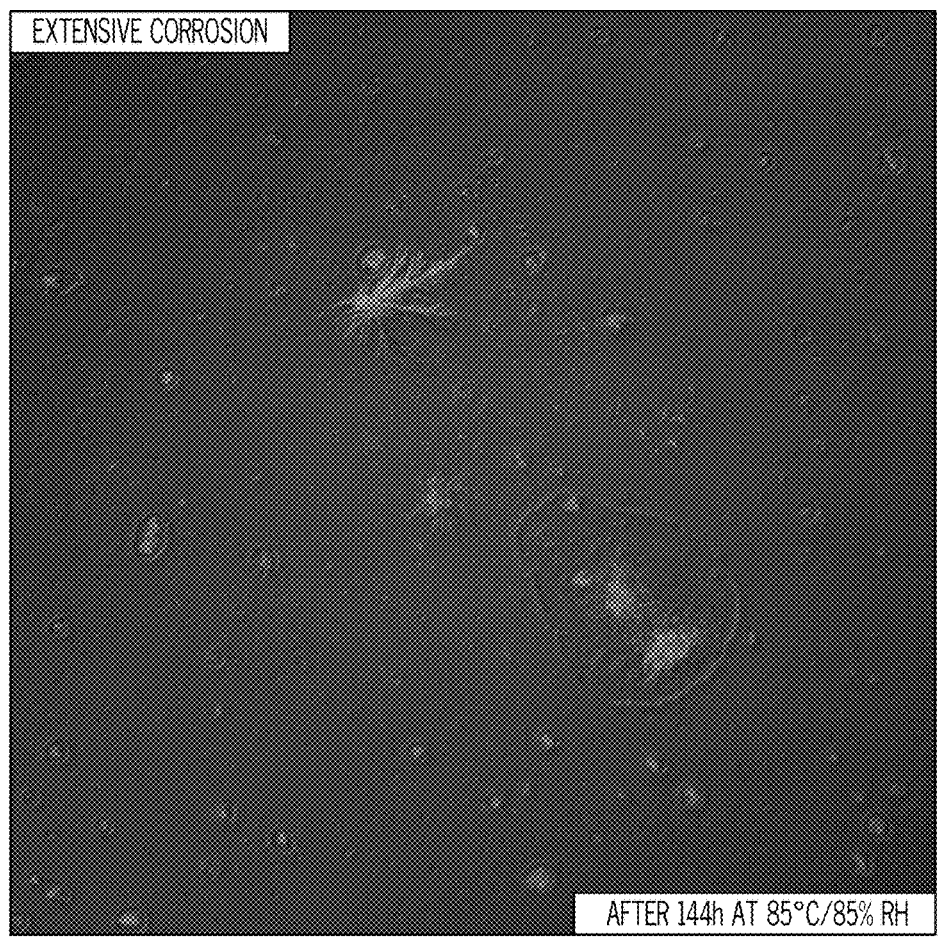
FIG. 15B is an optical micrograph of the glass ceramic article of FIG. 15A after exposure to 85° C./85% relative humidity aging conditions for 144 hours.
Figure 15C:
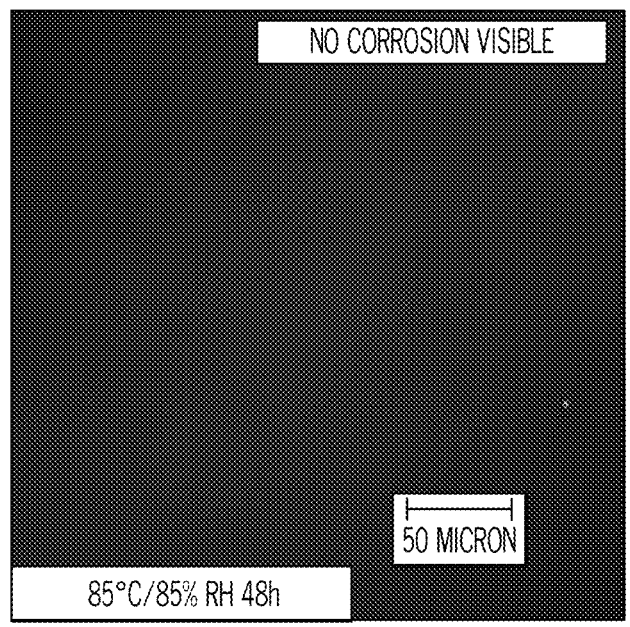
FIG. 15C is an optical micrograph of a glass ceramic article subjected to a no fringe ion exchange treatment according to one or more embodiments shown and described herein after exposure to 85° C./85% relative humidity aging conditions for 48 hours.
Figure 15D:
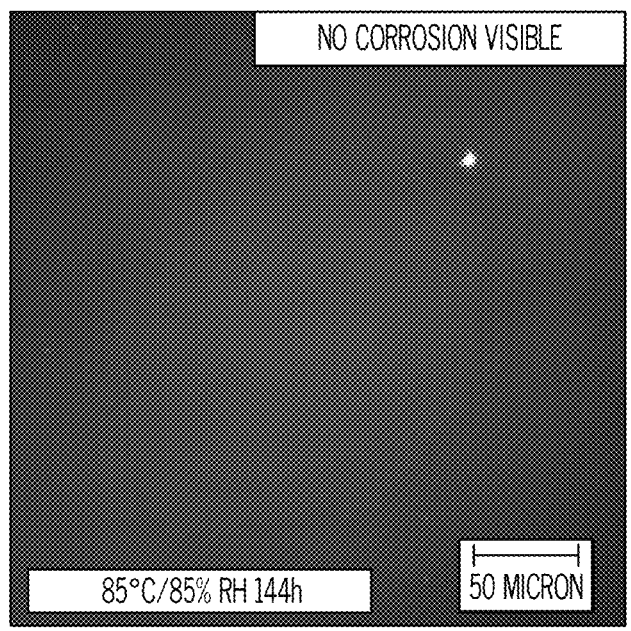
FIG. 15D is an optical micrograph of the glass ceramic article of FIG. 15C after exposure to 85° C./85% relative humidity aging conditions for 144 hours.

To further explore the aging effects, an optical micrograph of Sample CC was obtained before (FIG. 15A) and after (FIG. 15B) the sample was subjected to the accelerated aging test for 144 hours at 85° C. and 85% relative humidity. Optical micrographs were also obtained for Sample JJ, a glass ceramic article formed from Composition A and subjected to a no-fringe ion exchange treatment including 90 wt % KNO$_3$, 10 wt % NaNO$_3$, and 0.1 wt % LiNO$_3$ at 470° C. for 12 hours at 48 hours (FIG. 15C) and at 144 hours (FIG. 15D). As can be seen in the optical micrographs, Sample CC exhibits severe corrosion at 144 hours, while there is no corrosion visible for Sample JJ shown in FIGS. 15C and 15D.

Figure 16A:
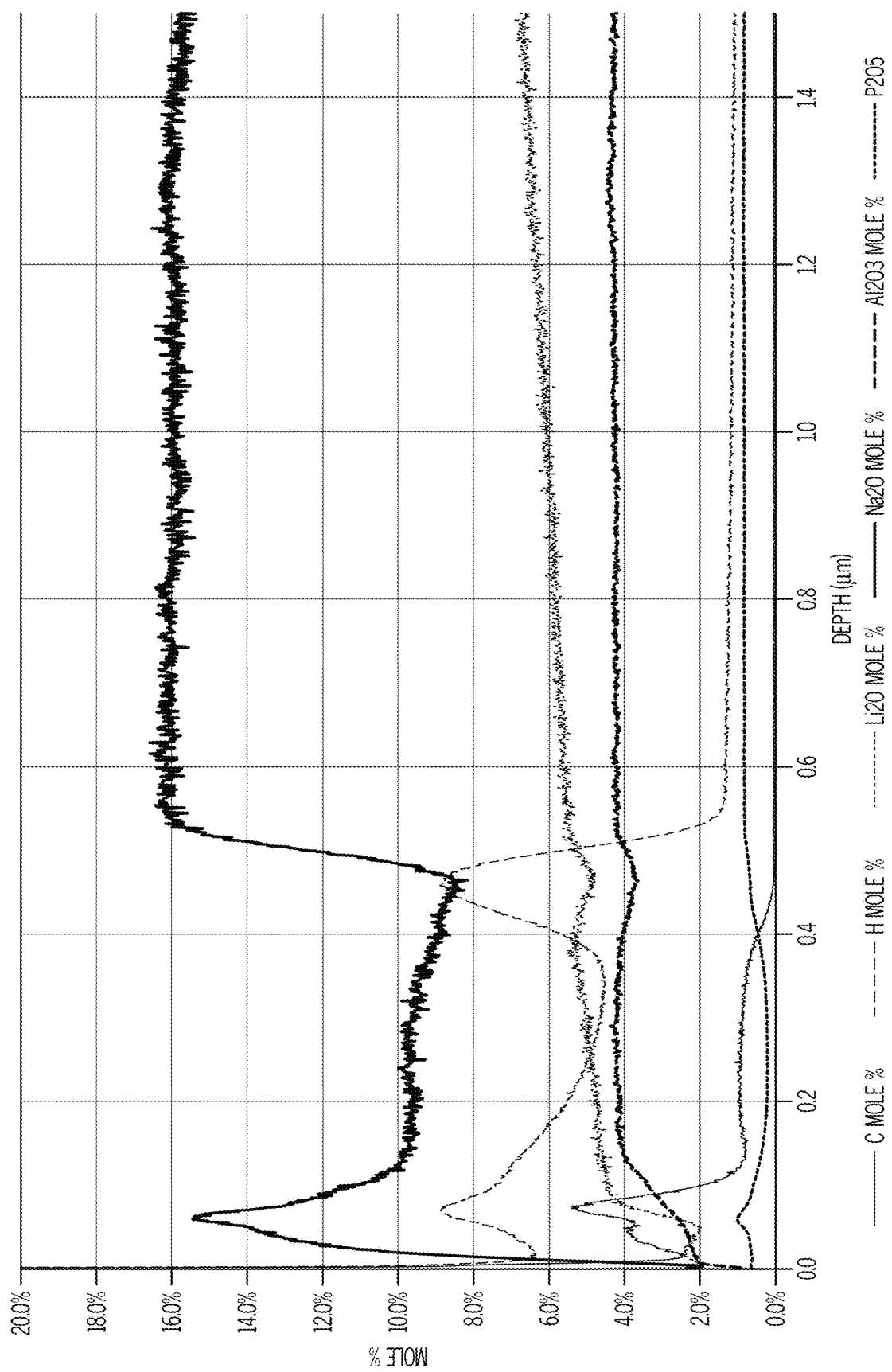
FIG. 16A is a plot of concentration (Y-axis, in mol % of the oxide) as a function of depth into the thickness of the sample from the surface (X-axis; in micrometers or μm) of carbon, hydrogen, $Li_2O$, $Na_2O$, $Al_2O_3$, and $P_2O_5$ elemental distribution in the glass ceramic substrate of FIG. 15B.
Figure 16B:
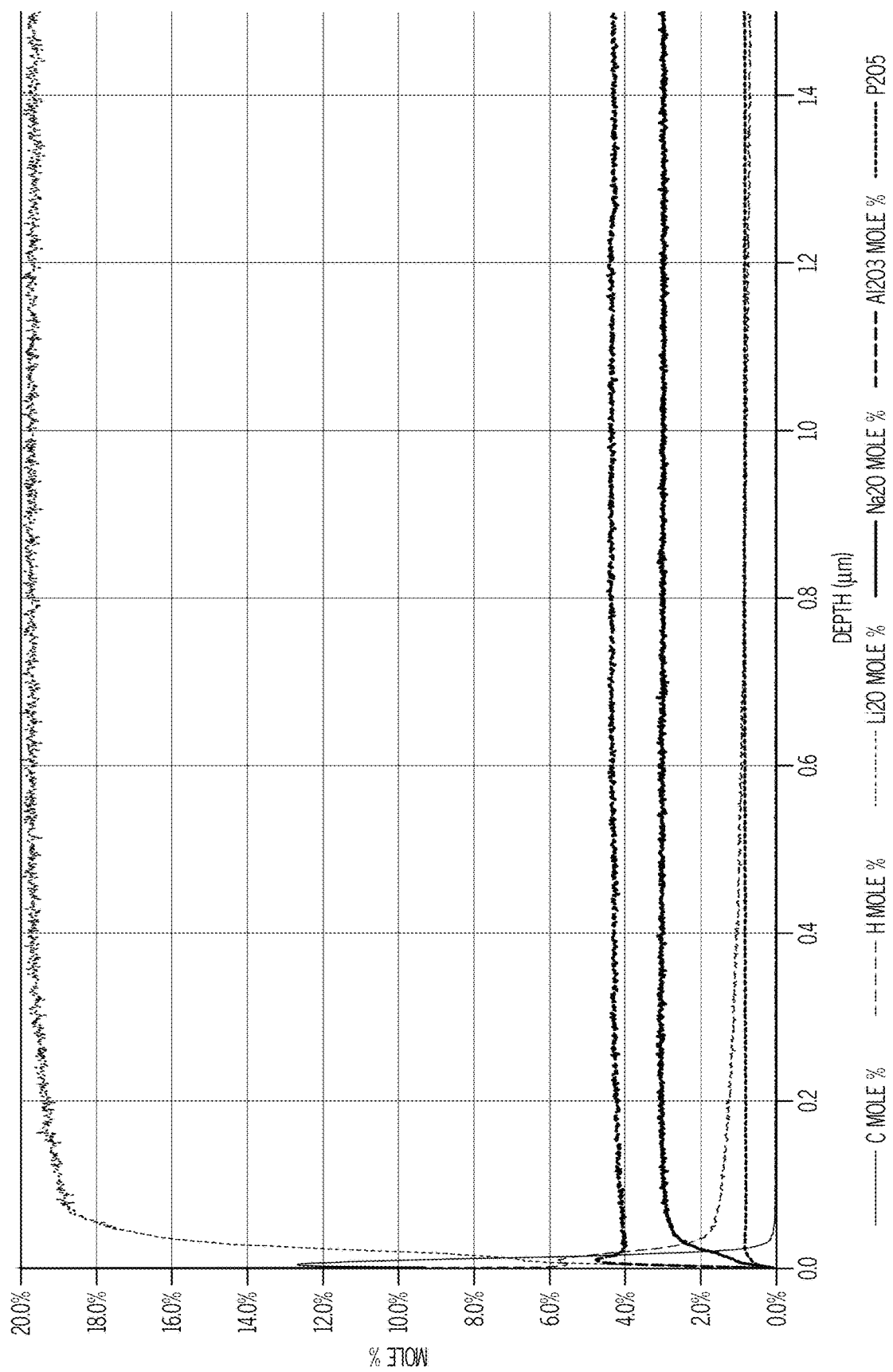
FIG. 16B is a plot of concentration (Y-axis, in mol % of the oxide) as a function of depth into the thickness of the sample from the surface (X-axis; in micrometers or μm) of carbon, hydrogen, $Li_2O$, $Na_2O$, $Al_2O_3$, and $P_2O_5$ elemental distribution in the glass ceramic substrate of FIG. 15D.

Elemental depth profiles for Samples CC and JJ were obtained for the first 300 nm of depth using SIMS depth profiling. The profiles are shown in FIGS. 16A and 16B, respectively. As shown in FIG. 16A, Sample CC developed a hydrated surface layer in which sodium was depleted and reacted with atmospheric CO$_2$. However, as shown in FIG. 16B, Sample JJ did not develop a hydration layer.

Various embodiments described herein enable improved glass ceramic performance, for example improved damage resistance, improved chemical durability, and decreased corrosion upon exposure to high humidity conditions, through chemical strengthening. Moreover, the ion exchange treatments described herein enable glass ceramic articles to be formed including one fringe for use with FSM metrology quality control techniques, or with no fringes. Various embodiments described herein further provide additional or alternative quality control processes for use when, for example, no fringes result from an ion exchange treatment or when the glass ceramic article is opaque.

Figure 18A:
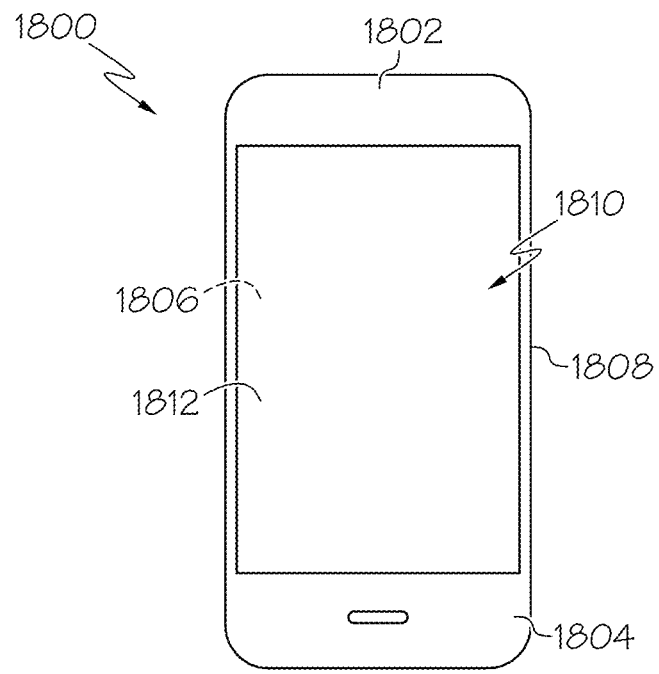
FIG. 18A is a plan view of an exemplary electronic device incorporating any of the strengthened articles disclosed herein.
Figure 18B:
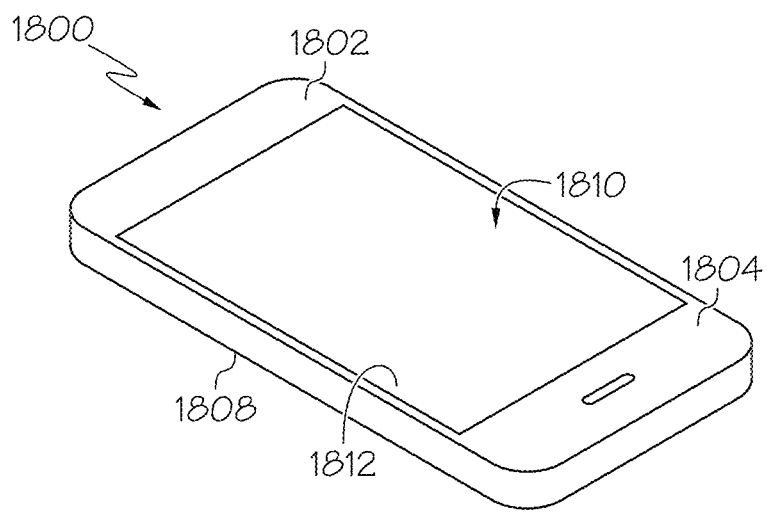
FIG. 18B is a perspective view of the exemplary electronic device of FIG. 18A.

The strengthened articles disclosed herein, for example the ion-exchanged glass ceramic articles, may be incorporated into another article for example an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the strengthened articles disclosed herein is shown in FIGS. 18A and 18B. Specifically, FIGS. 18A and 18B show a consumer electronic device 1800 including a housing 1802 having front 1804, back 1806, and side surfaces 1808; electrical components (not shown) that are at least partially inside or entirely within the housing and including at least a controller, a memory, and a display 1810 at or adjacent to the front surface of the housing; and a cover substrate 1812 at or over the front surface of the housing such that it is over the display. In some embodiments, at least one of the cover substrate 1812 or a portion of housing 102 may include any of the strengthened articles disclosed herein.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An ion-exchanged glass ceramic article comprising:
   a thickness t;
   a concentration of Li ions increases with increasing distance from an outer surface of the ion-exchanged glass ceramic article from a surface Li ion concentration to a maximum Li ion concentration, wherein a difference between the surface Li ion concentration and the maximum Li ion concentration is less than 5 mol %;
   a concentration of Na ions increases and then decreases with increasing distance from an outer surface of the ion-exchanged glass ceramic article from a surface Na ion concentration to a minimum Na ion concentration, wherein a difference between the surface Na ion concentration and the minimum Na ion concentration is less than 5 mol %, the surface Na ion concentration being less than 10 mol %; and
   the ion-exchanged glass ceramic article has a fracture toughness of greater than 1 MPa$\sqrt{m}$ as measured according to the double cantilever beam method.

2. The ion-exchanged glass ceramic article according to claim 1, wherein the concentration of Na ions is greater than 0 mol % throughout the thickness t of the ion-exchanged glass ceramic article.

3. The ion-exchanged glass ceramic article according to the claim 1, wherein the concentration of Na ions is greater than 0 mol % and less than 2.5 mol %.

4. The ion-exchanged glass ceramic article according to claim 1, wherein the maximum concentration of Li ions is from 19 mol % to 32 mol %.

5. The ion-exchanged glass ceramic article according to claim 1, wherein the fracture toughness is from 1 MPa$\sqrt{m}$ to 1.5 MPa$\sqrt{m}$ as measured according to the double cantilever beam method.

6. The ion-exchanged glass ceramic article according to claim 1, further comprising greater than 0 mol % to 6 mol % Al$_2$O$_3$.

7. The ion-exchanged glass ceramic article according to claim 1, further comprising from 0.7 mol % to 2.2 mol % P$_2$O$_5$.

8. The ion-exchanged glass ceramic article according to claim 1, further comprising from 1.7 mol % to 4.5 mol % ZrO$_2$.

9. The ion-exchanged glass ceramic article according to claim 1, further comprising from 60 mol % to 72 mol % SiO$_2$.

* * * * *